(12) United States Patent
Miki et al.

(10) Patent No.: US 8,054,340 B2
(45) Date of Patent: Nov. 8, 2011

(54) IMAGE INFORMATION MANAGEMENT SYSTEM AND METHOD

(75) Inventors: Yasutoshi Miki, Chiba (JP); Hisanaga Tamura, Chiba (JP)

(73) Assignee: Seiko Precision Inc., Chiba (JP)

(*) Notice: Subject to any disclaimer, the term of this patent is extended or adjusted under 35 U.S.C. 154(b) by 902 days.

(21) Appl. No.: 12/017,519

(22) Filed: Jan. 22, 2008

(65) Prior Publication Data
US 2008/0174675 A1 Jul. 24, 2008

(30) Foreign Application Priority Data
Jan. 22, 2007 (JP) ................... 2007-011546

(51) Int. Cl.
H04N 5/76 (2006.01)
H04N 7/18 (2006.01)

(52) U.S. Cl. .................... 348/231.2; 348/143

(58) Field of Classification Search ............ 348/231.99, 348/231.1, 231.2, 231.3, 231.5, 143, 231.6, 348/231.9, 207.99
See application file for complete search history.

(56) References Cited

U.S. PATENT DOCUMENTS

| | | | |
|---|---|---|---|
| 5,805,215 A * | 9/1998 | Mizoguchi | 348/231.5 |
| 7,035,313 B2 * | 4/2006 | Fry | 375/132 |
| 2002/0003575 A1 * | 1/2002 | Marchese | 348/231 |
| 2003/0189638 A1 * | 10/2003 | Fry | 348/154 |

FOREIGN PATENT DOCUMENTS

| | | |
|---|---|---|
| JP | 08-229178 | 9/1996 |
| JP | 2003187015 | 7/2003 |
| JP | 2005033692 | 2/2005 |
| JP | 2005033692 A * | 2/2005 |
| JP | 2005-165805 | 6/2005 |
| JP | 2006287656 | 10/2006 |

* cited by examiner

*Primary Examiner* — David Ometz
*Assistant Examiner* — Ahmed A Berhan
(74) *Attorney, Agent, or Firm* — Howard & Howard Attorneys PLLC

(57) ABSTRACT

An imaging device detects an occurrence of a trigger event, stores images before and after the trigger event occurrence for a specified time and transmits them to an image management server. The image management server stores the image file and key information associated with the image file, the key information including information related to timing of the trigger event occurrence related to the image in an image DB. When the image management server receives a search condition, the image management server obtains an image file stored in association with the key information satisfying the designated search condition from the image DB.

7 Claims, 25 Drawing Sheets

FIG.4

IMAGE DB 213a

| KEY 1 | KEY 2 | | TIME STAMP | PUBLIC KEY | IMAGE FILE | IMAGE TIME STAMP AT TRIGGER | IMAGE PUBLIC KEY AT TRIGGER |
|---|---|---|---|---|---|---|---|
| TRIGGER TIME α | CARD ID α | AUTOMATED TELLER MACHINE ID α | TIME STAMP α | PUBLIC KEY α | FILE α | TIME STAMP β | PUBLIC KEY β |
| ... | ... | ... | ... | ... | ... | ... | ... |

FIG.11

IMAGE DB 213b

| KEY 1 | KEY 2 | KEY 3 | KEY 4 | TIME STAMP | PUBLIC KEY | IMAGE FILE |
|---|---|---|---|---|---|---|
| PLAYER NUMBER | THE NUMBER OF ATTEMPTS | JUDGMENT RESULT | TAKEOFF DISTANCE | TIME STAMP α | PUBLIC KEY α | IMAGE FILE α |
| ... | ... | ... | ... | ... | ... | ... |

FIG.15

CAMERA INFORMATION DB 213c

| CAMERA ID | POSITION INFORMATION |
|---|---|
| CAMERA 1 | XX m FROM JUMP POSITION |
| ... | ... |

FIG.19

IMAGE DB 213d

| TRIGGER OCCURRENCE TIME | IMAGING DEVICE ID | IMAGE DATA FILE |
|---|---|---|
| TIME α | ID α | IMAGE DATA FILE α |
| ... | ... | ... |

FIG.23

IMAGE DB 213e

| KEY 1 | KEY 2 | CAMERA DIRECTION (ONLY MASTER CAMERA) | TARGET DISTANCE (ONLY MASTER CAMERA) | IMAGE DATA FILE |
|---|---|---|---|---|
| TRIGGER OCCURRENCE TIME α | IMAGING DEVICE ID α | ANGLE α° | DISTANCE α | FILE α |
| | IMAGING DEVICE ID β | — | — | FILE β |
| ⋮ | ⋮ | ⋮ | ⋮ | ⋮ |

IMAGE INFORMATION MANAGEMENT SYSTEM AND METHOD

RELATED APPLICATION

This application claims priority to Japanese Patent Application No. 2007-011546 filed Jan. 22, 2007.

BACKGROUND OF THE INVENTION

1. Field of the Invention

The present invention relates to an image information management system and method which store images before and after a trigger with key information associated with the images and search the stored image based on the key information.

2. Description of the Related Art

A digital image can be recorded for a long time at present owing to expansion of storage capacity and price reduction of an apparatus. However, if all the events are recorded, when a desired image lasts only for a short time in the long-time image, the required information should be searched in the vast volume of information. In this case, there is a problem that time for searching necessary information becomes long. Then, an art to record only a required image and search a desired image in recorded images in a short time is in demand.

As a method of storing a required image, such an art is proposed that when a trigger occurs, an image before and after the occurrence of the trigger is recorded. For example, in Unexamined Japanese Patent Application KOKAI Publication No. 2005-165805, an art is disclosed that by storing images before and after a collision using a sudden speed change at the collision as a trigger, a situation at occurrence of the accident is recorded. However, Unexamined Japanese Patent Application KOKAI Publication No. 2005-165805 discloses an art to store a required image but does not describe an art to search and take out a desired image from the stored images.

SUMMARY OF THE INVENTION

The present invention was made in order to solve the above problem. The present invention has an object to provide an image information management system, method and computer-readable recording medium for recording only a required image and searching required data from the recorded images.

In order to achieve the above object, an image information management system according to a first aspect of the present invention comprises:

an imaging device and an image information storage device connected to the imaging device through a network; wherein the imaging device including:

a trigger event detecting section which detects occurrence of a trigger event;

a photographing section which photographs images continuously;

an image memory section which stores images photographed within a first predetermined time period before current time, and when an occurrence of a trigger event is detected by said trigger event detecting section, maintains the images photographed within the first predetermined time before the trigger event occurs and stores images photographed by said photographing section within a second predetermined time period after the trigger occurs; and an image file creating section that, when the occurrence of a trigger event is detected by said trigger event detecting section, awaits until the second predetermined time period lapses, and then creates an image file of the images stored in said image memory section; and said image information memory section including:

an image information memory section which obtains an image file created by said image file creating section from said imaging device and storing the image file and key information associated with the image file, the key information including information relating to timing of the occurrence of the trigger event; and an image file obtaining section which receives a search condition and obtaining the image file, which is in association with the key information satisfying the received search condition, from said image information memory section.

A method according to a second aspect of the present invention comprises:

a capturing step of capturing images continually;

a detecting step of detecting an occurrence of a trigger event;

an image file creating step of creating an image file including images captured within the first predetermined time before detection of the occurrence of the trigger event and images captured within a second predetermined time period after detection of the occurrence of the trigger event;

an adding step of adding key information to the created image file created in the image file creating step, the key information including information relating to timing of the occurrence of the trigger event; and a search step of searching an image file, which is association with the key information satisfying the search condition.

A computer-readable recording medium according to a third aspect of the present invention records a program controlling a computer to execute:

a capturing step of capturing images continually;

a detecting step of detecting an occurrence of a trigger event;

an image file creating step of creating an image file including images captured within the first predetermined time before detection of the occurrence of the trigger event and images captured within a second predetermined time period after detection of the occurrence of the trigger event;

an adding step of adding key information to the created image file created in the image file creating step, the key information including information relating to timing of the occurrence of the trigger event; and a search step of searching an image file, which is associated with the key information satisfying the search condition.

BRIEF DESCRIPTION OF THE DRAWINGS

These objects and other objects and advantages of the present invention will become more apparent upon reading of the following detailed description and the accompanying drawings in which:

FIG. 4 is a diagram illustrating a data configuration example of an image DB according to the first embodiment;

FIG. 11 is a diagram illustrating a data configuration example of the image DB according to the second embodiment;

FIG. 15 is a diagram illustrating a data configuration example of camera information DB stored by the image management server;

FIG. 19 is a diagram illustrating a data configuration example of the image DB according to the fourth embodiment;

FIG. 23 is a diagram illustrating a data configuration example of the image DB according to the fifth embodiment;

DETAILED DESCRIPTION OF THE PREFERRED EMBODIMENTS

First Embodiment

Embodiments of the present invention will be described below referring to the attached drawings.

Figure 1:
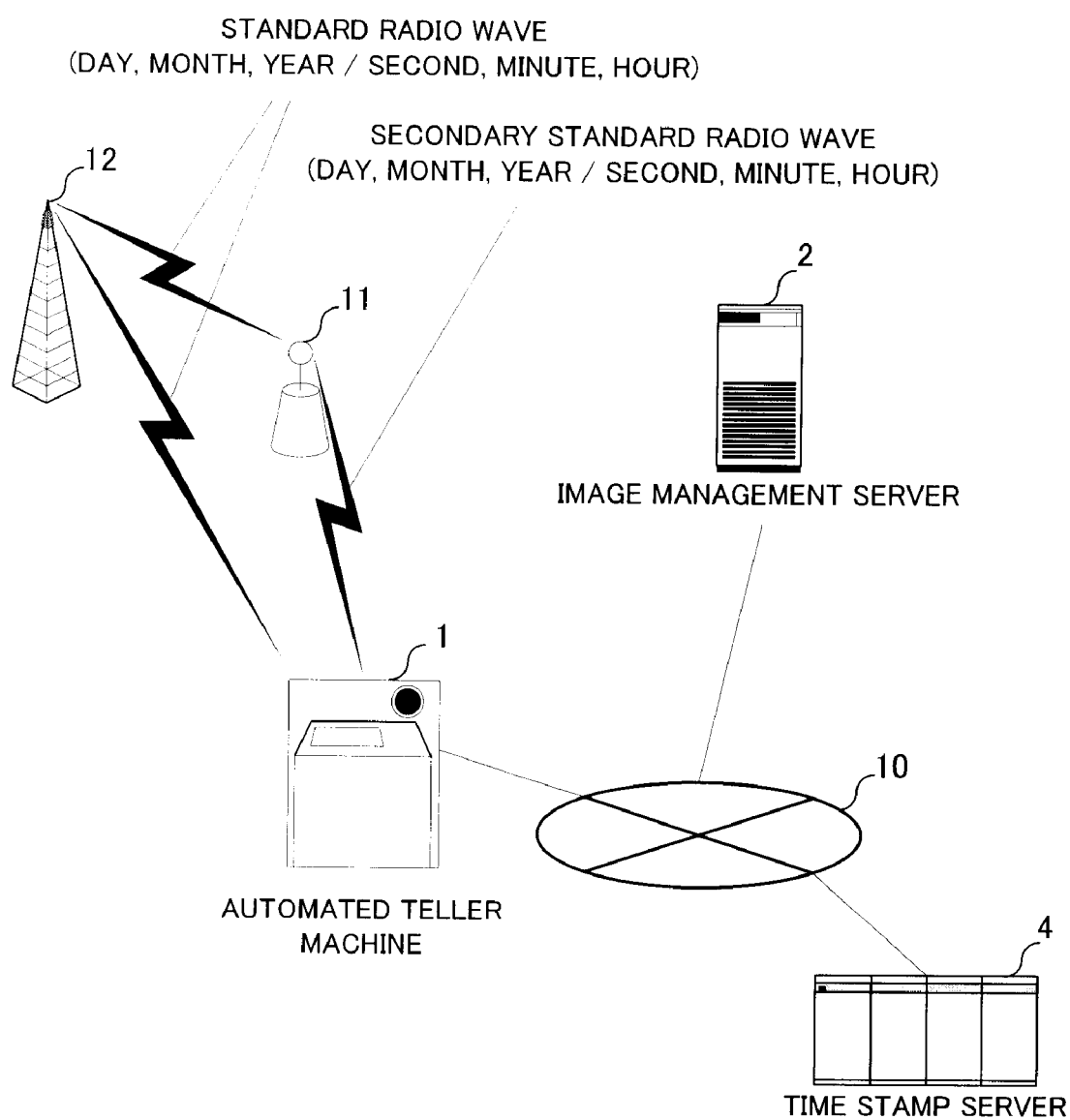
FIG. 1 is a diagram illustrating a configuration example of a system according to a first embodiment.

In a first embodiment, an image management system will be described using a monitoring system such as an automated teller machine as an example. This monitoring system is provided with, as shown in FIG. 1, an automated teller machine 1 with camera, an image management server 2, a time stamp server 4, a network 10, a relay machine 11, and a radio tower 12. The automated teller machine 1, the image management server 2, and the time stamp server 4 share a configuration connected to each other through the network 10. The relay machine 11 has functions to receive a standard wave containing standard time information from the radio tower 12 and to transmit the information to the automated teller machine 1 by wireless as secondary standard wave. Each configuration will be detailed below.

Figure 2:
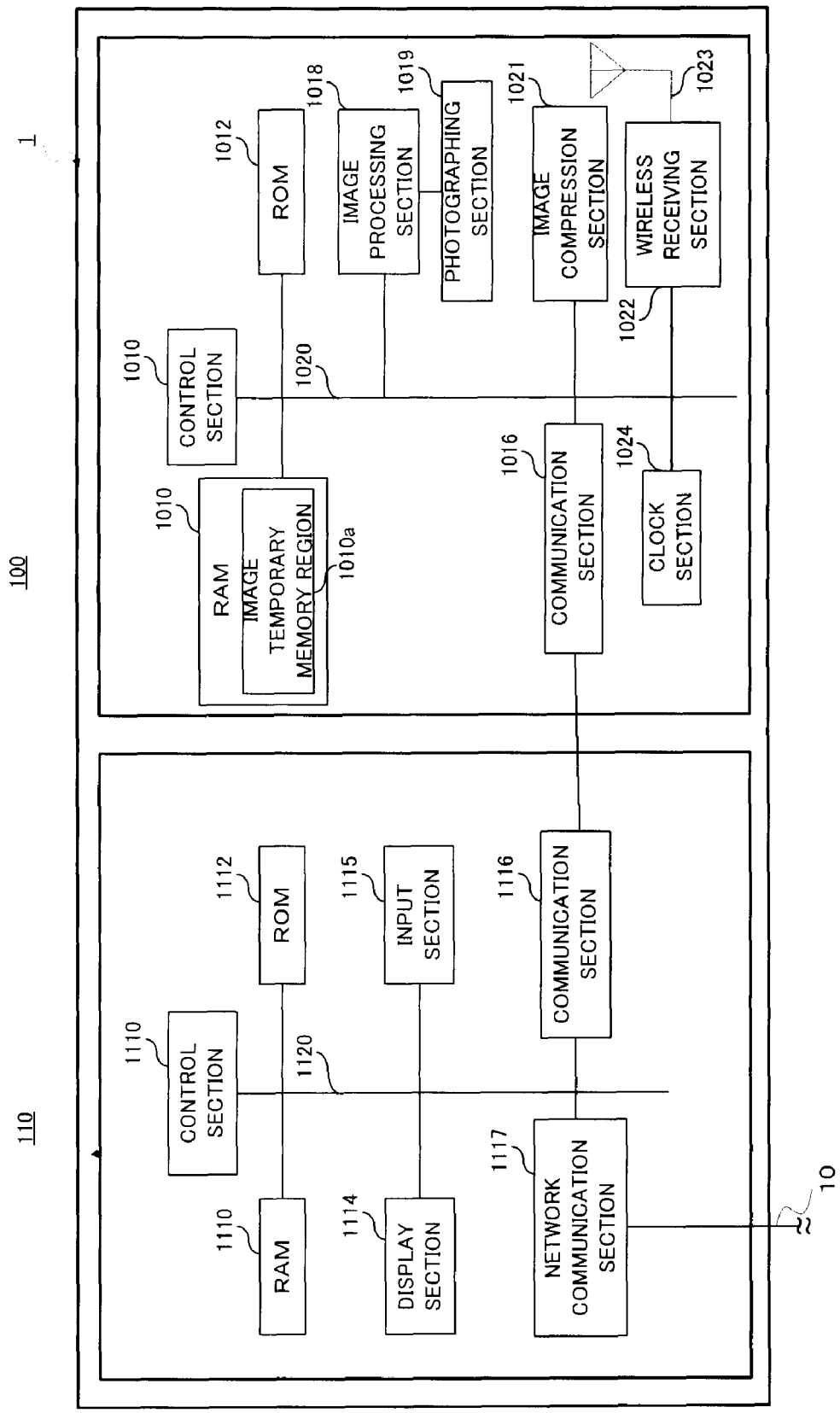
FIG. 2 is a diagram illustrating a configuration example of an automated teller machine according to the first embodiment.

First, the automated teller machine 1 will be described. The automated teller machine 1 comprises, as shown in FIG. 2, an imaging device 100 for photographing an image and storing the photographed image as image data in the Motion JPEG format or the like and a processing section 110 for carrying out processing required for the automated teller machine.

The imaging device 100 will be described below. The imaging device 100 is provided with, as shown in FIG. 2, a control section 1010, a RAM (Random Access Memory) 1011, a ROM (Read Only Memory) 1012, a communication section 1016, an image processing section 1018, a photographing section 1019, a bus 1020, an image compression section 1021, a wireless receiving section 1022, an antenna 1023, and a clock section 1024.

The control section 1010 comprises a CPU (Central Processing Unit) and the like. The control section 1010 controls the entire imaging device 100 by executing a control program stored in the ROM 1012, which will be described later, using the RAM 1011, which will be also described later, as a working area. Details of an operation of the control section 1010 will be described later.

The RAM (Random Access Memory) 1011 is a volatile memory for temporarily storing data required for processing by the control section 1010 and comprises an image temporary memory region 1011a. The image temporary memory region 1011a temporarily stores the latest image data for predetermined time a while overwriting past data all the time. Therefore, the memory capacity of the image temporary memory region 1011a is provided with a memory capacity of the size capable of storing image data for the time a based on a frame rate or the like of the image processing section 1018.

The ROM (Read Only Memory) 1012 is a non-volatile memory for storing a program or the like for the control section 1010 to control the entire image device 100.

The communication section 1016 is a communication interface circuit for communicating with the processing section 110, which will be described later.

The image processing section 1018 comprises an AD converter (analogue-digital converter) and the like. The image processing section 1018 applies processing such as AD conversion to an image signal generated by the photographing section 1019, which will be described later, and then supplies the digital signal to the image temporary memory region 1011a.

The photographing section 1019 comprises a lens, an image pick-up device such as a CCD (Coupled Charge Device), a driving circuit and the like. The photographing section 1019 photoelectrically converts an optical image of a subject formed by the lens to an electrical image signal. The photographing section 1019 supplies the generated image signal to the image processing section 1018. The driving circuit controls a position of the lens for zooming and focusing controls.

The image compression section 1021 comprises an image compression circuit and the like and converts an inputted image or image signal to image data in the JPEG format or Motion JPEG format.

The wireless receiving section 1022 comprises a receiving circuit and the like. The wireless receiving section 1022 directly receives a standard wave including standard time information from the radio tower 12, which will be described later, through the antenna 1023, or receives a secondary standard wave transmitted from the relay machine 11 and obtains the standard time information.

The clock section 1024 adjusts time and times standard time based on the standard time information received from the wireless receiving section 1022.

The bus 1020 is a transmission path for transferring a command and data among the control section 1010, the RAM (Random Access Memory) 1011, the ROM (Read Only Memory) 1012, the communication section 1016, the image processing section 1018, the photographing section 1019, the image compression section 1021, the wireless receiving section 1022, and the clock section 1024.

Next, the processing section 110 of the automated teller machine 1 will be described. The processing section 110 realizes functions required as the automated teller machine and comprises a control section 1110, a RAM (Random Access Memory) 1111, a ROM (Read Only Memory) 1112, a display section 1114, an input section 1115, a communication section 1116, a network communication section 1117, and a bus 1120 as shown in FIG. 2.

The control section 1110 comprises a CPU (Central Processing Unit) and the like and carries out control of the entire processing section 110. Specifically, the control section 1110 executes a control program stored in the ROM 1112, which will be described later, using the RAM 1111, which will be also described later, as a work area and controls the entire processing section 110. Details of an operation of the control section 1110 will be described later.

The RAM (Random Access Memory) 1111 is a volatile memory for temporarily storing data required for processing executed by the control section 1110.

The ROM (Read Only Memory) 1112 is a non-volatile memory storing a program and the like for the control section 1110 to carry out control of the entire processing section 110.

The display section 1114 includes an output device such as an LCD (Liquid Crystal Display). The input section 1115 comprises a keyboard, a touch panel, which is a contact-type input device, and the like for input of arbitrary data/information. The touch panel may be laminated on the display section 1114 to be configured as a touch-panel type display device.

The communication section 1116 is a communication interface circuit for communicating with the imaging device 100.

The network communication section 1117 comprises an NIC (Network Interface Card) and the like and is provided with an interface for connecting the processing section 110 to the network 10. The processing section 110 carries out communication based on the TCP/IP protocol with the network 10 through the network communication section 1117. The network communication section 1117 may include a modem device or an infrared communication device, for example.

The bus 1120 is a transmission path for transferring a command and data among the control section 1110, the RAM (Random Access Memory) 1111, the ROM (Read Only Memory) 1112, the display section 1114, the input section 1115, the communication section 1116, and the network communication section 1117.

Each of the above configurations is main configuration required to realize the present invention by the automated teller machine. Other configurations required as the automated teller machine are supposed to be provided as necessary.

Figure 3:
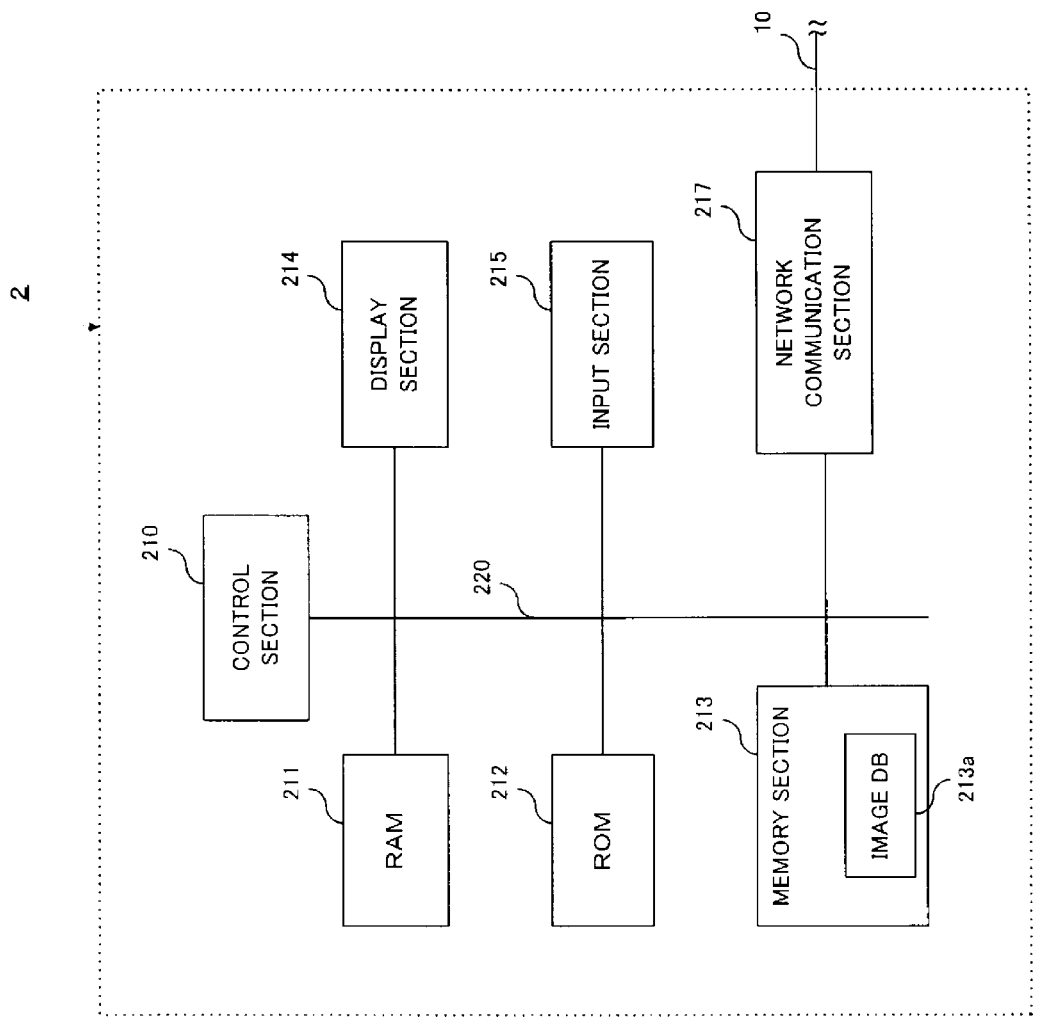
FIG. 3 is a diagram illustrating a configuration example of an image management server according to the first embodiment.

Next, the image management server 2 will be described. As shown in FIG. 3, the image management server 2 is a device for storing image files transmitted from the imaging device 100 in the automated teller machine 1 through the network 10. The image management server 2 is installed at a security company, for example. The image management server 2 comprises a control section 210, a RAM (Random Access Memory) 211, a ROM (Read Only Memory) 212, a memory section 213, a display section 214, an input section 215, a network communication section 217, and a bus 220.

The control section 210 comprises a CPU (Central Processing Unit) and the like. The control section 210 control the entire image management server 2 by executing a control program stored in the ROM 212 and the memory section 213, which will be described later, using the RAM 211, which will be also described later, as a work place. Details of an operation of the control section 210 will be described later.

The RAM (Random Access Memory) 211 is a volatile memory for temporarily storing data required for processing by the control section 210.

The ROM (Read Only Memory) 212 is a non-volatile memory storing a program and the like for the control section 210 to control the entire image management server 2. In this embodiment, a program for controlling the control section 210 is stored in the ROM 212 but may be stored in the memory section 213, which will be described later.

The memory section 213 comprises a large-capacity hard disk device and the like and stores an image database (image DB) 213a storing image files transmitted from the automated teller machine 1. The image DB 213a stores, as shown in FIG. 4, the image file, key information for searching the image file (trigger occurrence time, card ID, and automated teller machine ID), a time stamp corresponding to the image file and a public key for decoding a time stamp, a time stamp corresponding to the image at the trigger occurrence time and the public key in association with each other as a single record. In addition, the memory section 213 stores an application program for other operations such as image search.

The display section 214 includes an output device such as an LCD (Liquid Crystal Display) and displays images, subtitles and the like.

The input section 215 comprises an input device such as a keyboard for inputting arbitrary data/information.

The network communication section 217 comprises an NIC (Network Interface Card) and the like and is provided with an interface to connect the image management server 2 to the network 10. The image management server 2 carries out communication based on the TCP/IP protocol with the network 10 though the network communication section 217. The network communication section 217 may include a modem device or an infrared communication device, for example.

The bus 220 is a transmission path for transferring a command and data among the control section 210, the RAM 211, the ROM 212, the display section 214, the input section 215, and the network communication section 217.

A time stamp server 4 shown in FIG. 1 is a server operated by a time stamp authority such as Japan-Time Stamp Authority. The time stamp server 4 is provided with a time stamp function to issue a time stamp to a hash value of a file to be time-stamped and sends it back to the sender, when received it with a time stamp request.

Lastly, the radio tower 12 shown in FIG. 1 is supposed to be standard wave transmission facilities operated by National Institute of Information and Communications Technology. The relay machine 11 receives a standard wave including standard time information from the radio tower 12 and transmits the information as the secondary standard wave to the automated teller machine 1 through wireless or the like.

Next, an operation of the monitoring system to which the image recording and searching device is applied will be described.

The imaging device 100 receives data relating to standard time from the radio tower 12 or the relay machine 11 through the wireless receiving section 1022. The clock section 1024 times correct time all the time by modifying time based on the received data relating to the standard time. The image temporary memory section 1011a associates the photographed image with the photographed time based on the time timed by the clock section 1024 for each frame and temporarily stores the latest image data for predetermined a time, while overwriting past data all the time.

Next, a flow in which the automated teller machine 1 creates an image file by compressing images before and after a trigger when an event to be a trigger occurs and the file is transmitted to the image management server 2 will be described referring to the flowchart in FIG. 6.

Figure 6:
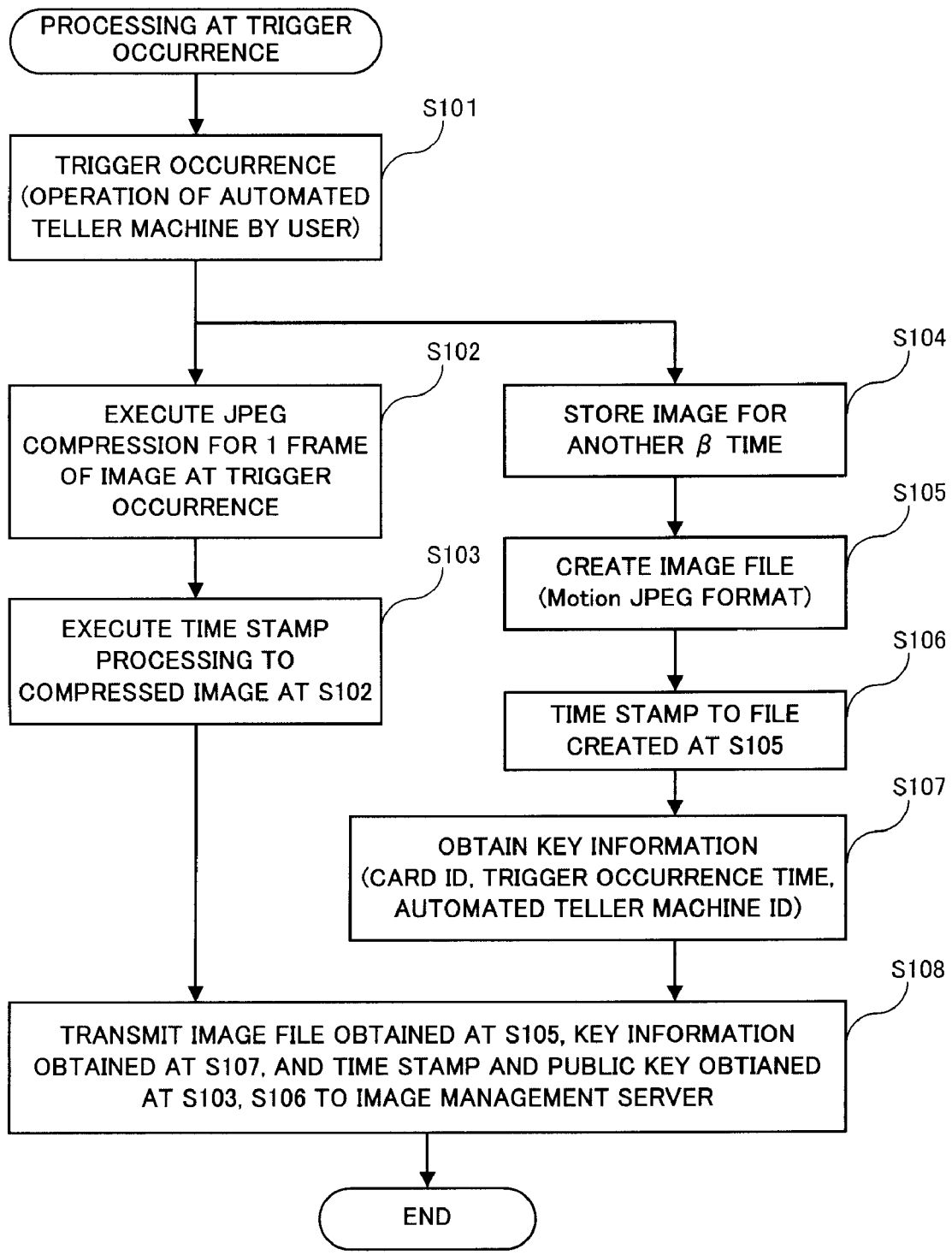
FIG. 6 is a flowchart illustrating an example of processing by an imaging device according to the first embodiment.

As shown in FIG. 6, when a user operates the automated teller machine 1, this operation becomes a trigger (Step S101). Then, the control section 1110 of the processing section 110 transmits a signal to notify that an event to be a trigger has occurred to the imaging device 100 through the communication sections 1116 and 1016. Upon receipt of this signal, the control section 1010 of the imaging device 100 supplies an image of a single frame at the occurrence of the trigger stored in the image temporary memory region 1011a to the image compression section 1021 and compresses it in the JPEG format (Step S102). Then, the control section 1010 transmits a hash value of the image compressed at Step S102 to the time stamp server 4 to ask for time stamp processing (Step S103). A typical time stamp flow is shown in FIG. 8A.

Figure 8A:
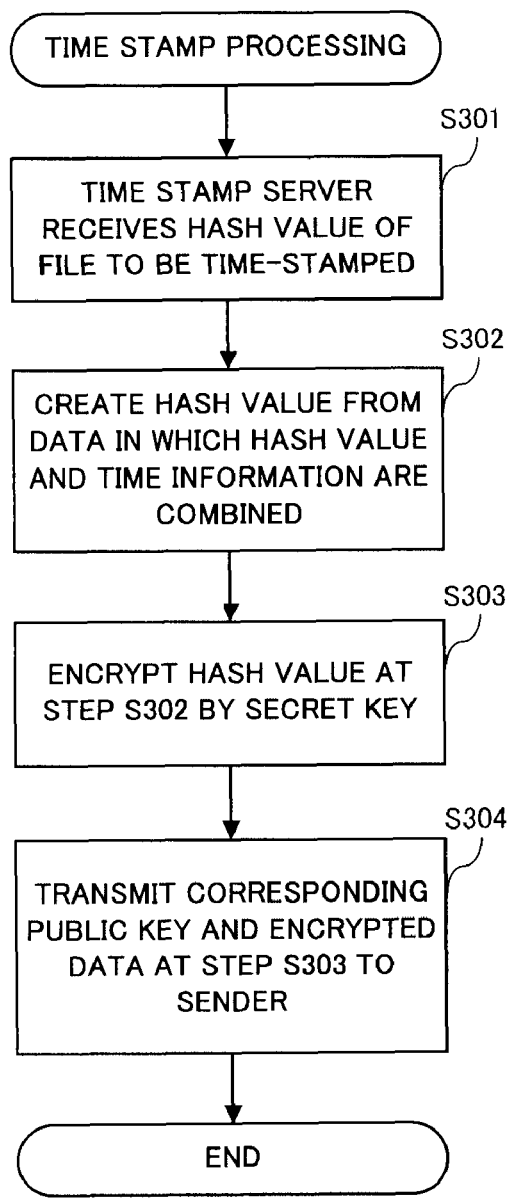
FIG. 8A is a flowchart illustrating an example of time stamp processing.

As shown in FIG. 8A, in the time stamp processing, first, the time stamp server 4 receives a hash value of a file to be stamped from the imaging device 100 (Step S301). Then, the time stamp server 4 creates a hash value based on data in which the received hash value and time information are combined (Step S302). The time stamp server 4 encrypts the hash value created at Step S302 by a secret key so as to issue a time stamp token, which is a time certificate (Step S303). Then, the time stamp server 4 transmits the time stamp token and the public key to the imaging device 100 (Step S304). When the time stamp token and the public key are received, the imaging device 100 temporarily stores them.

This flow of time stamp is an example, and the time stamp can be carried out by other methods.

Figure 5:
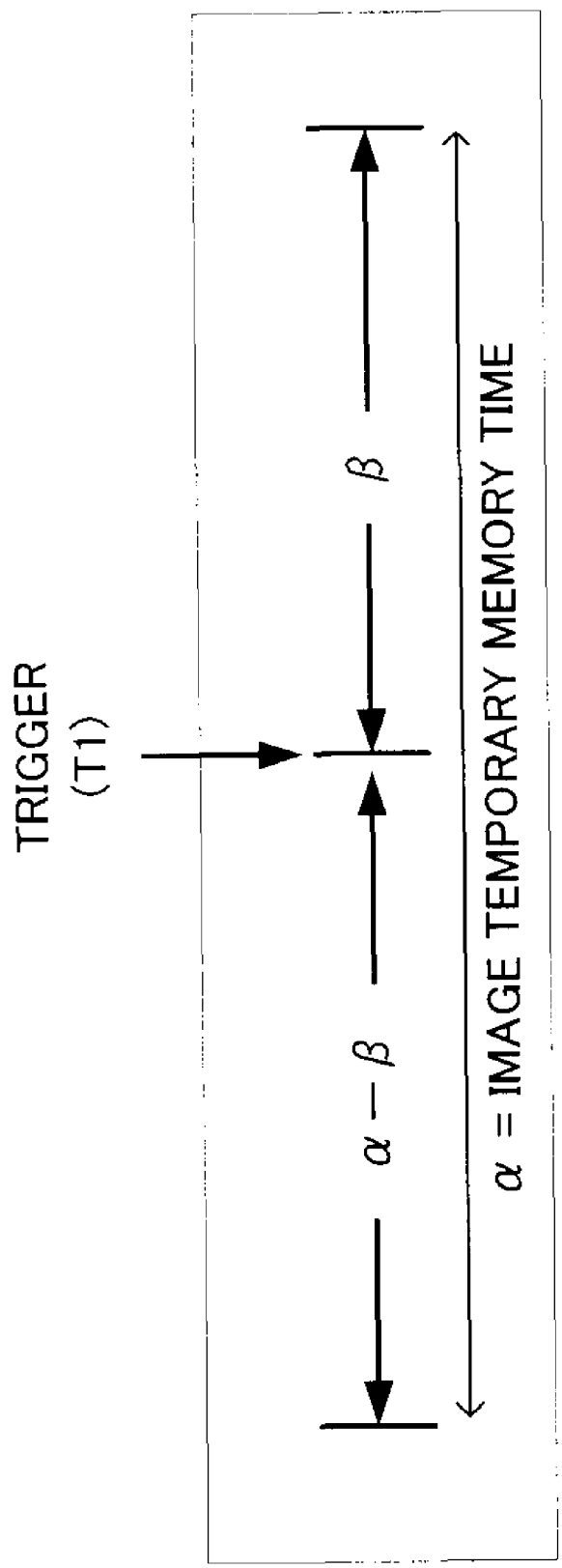
FIG. 5 is a diagram for explaining an image memory time before and after a trigger.

At the same time as the time stamp, the control section 1010 waits that the image processing section 1018 further stores image data for β time from occurrence of the trigger in the image temporary memory region 1011a as shown in the flowchart in FIG. 6 (Step S104). When the image data for the β time from occurrence of the trigger has been stored, the image temporary memory region 1101a has stored the image data for the β time after the trigger occurrence and the image data before the trigger occurrence (α-β). The control section 1010 transmits the image data stored in the image temporary memory region 1101a to the image compression section 1021. Upon receipt of the image data, the image compression section 1021 creates an image file by converting the file into the Motion JPEG format and temporarily stores it in the RAM 1011 (Step S105). The length of the image before and after the trigger occurrence ((α-β) time and β time (See FIG. 5)) may be changed according to use.

Then, the control section 1010 transmits the hash value of the image file created at Step S105 to the time stamp server 4 and asks for time stamp (Step S106). When the time stamp token corresponding to the image file and the public key are obtained as the result of the time stamp, the control section 1010 requests a card ID to identify a cash card used when the automated teller machine 1 is operated and information on ID to identify the individual automated teller machine 1 from the processing section 110 (Step S107). When the requested data is obtained, the control section 1010 transmits the trigger time, the card ID, the automated teller machine ID, the time stamp token corresponding to the image file and the public key, and the time stamp token corresponding to the image at the trigger occurrence and the public key together with the image file to the image management server 2 (Step S108). Since the JPEG image at the trigger occurrence is included in the Motion JPEG image file, it does not have to be stored separately.

In this embodiment, the control section 1010 does not receive the subsequent trigger till the β time has elapsed since the trigger occurrence time T1.

Next, an operation of the image management server 2 will be described.

When the image file and information relating to that are received, the control section 210 of the image management server 2 associates these information with each other and stores them as a single record in the image DB 213a as shown in FIG. 4.

Figure 7:
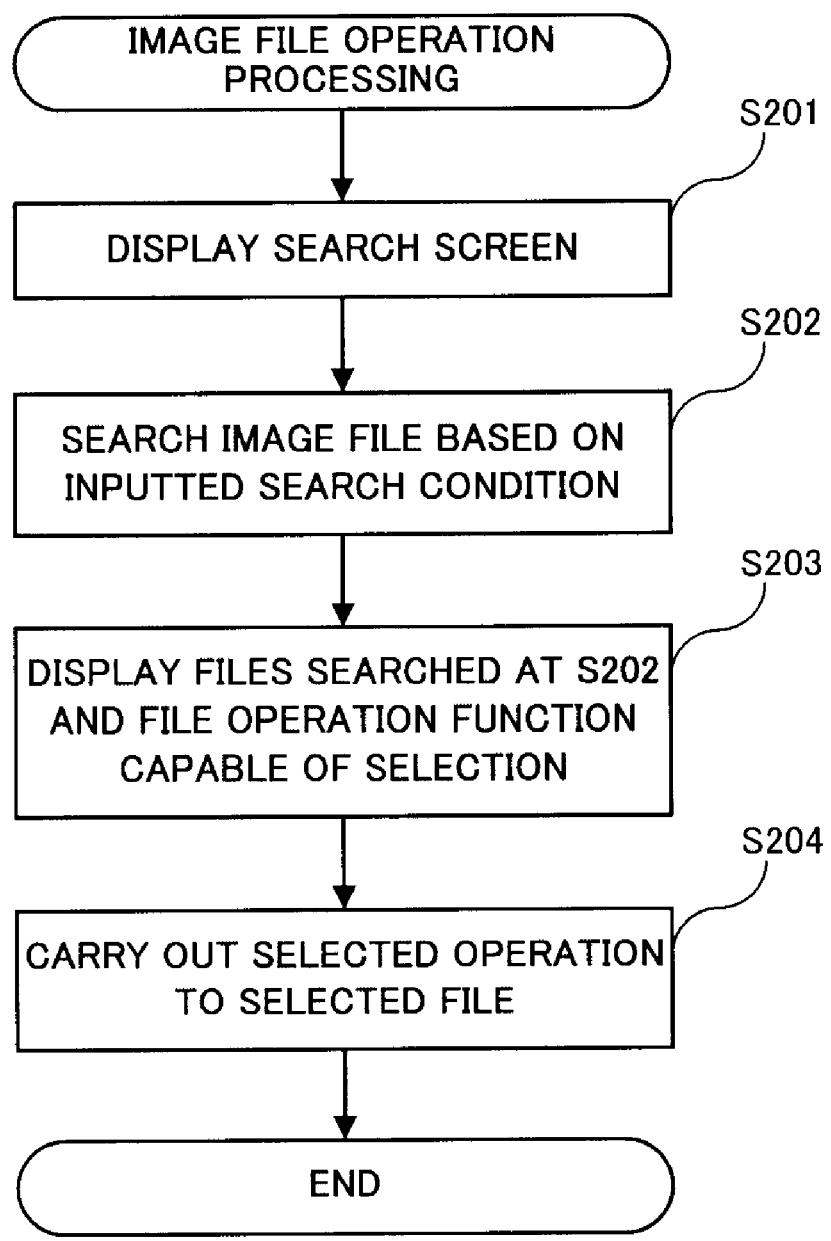
FIG. 7 is a flowchart illustrating an example of processing by the image management server according to the first embodiment.

The image management server 2 is provided with an application program for search or the like of the image file stored in the image DB 213a. The control section 210 of the image management server 2 carries out an operation shown in FIG. 7 according to the application program.

Figure 8B:
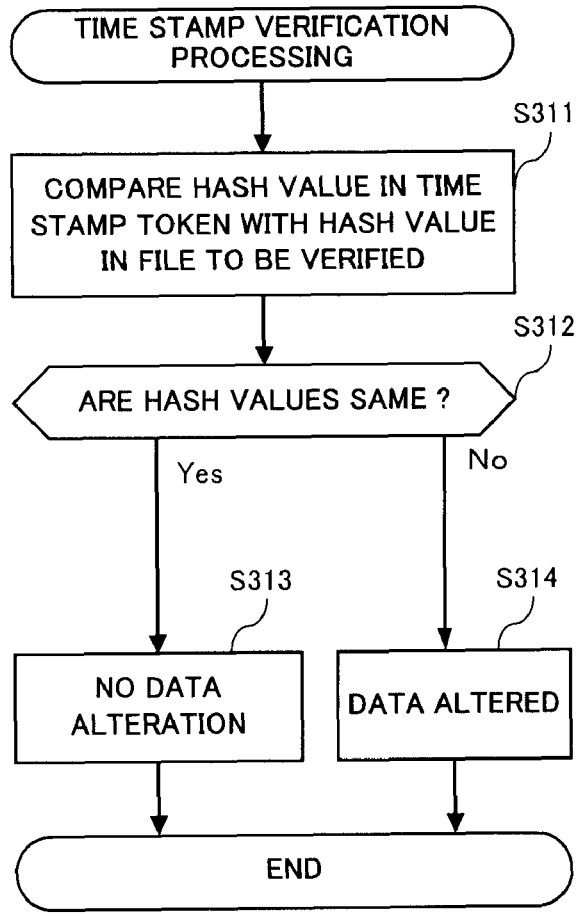
FIG. 8B is a flowchart illustrating an example of time stamp verification processing.

The control section 210 displays a screen for image search and receives input by a user (Step S201). When the user inputs a card ID, a automated teller machine ID, trigger time or the like to be a search key from the input section 215, the control section 210 of the image management server 2 detects the operation by the user, refers to the image DB 213a, and searches an image file having a key matching the inputted information (Step S202). If an image file satisfying conditions are found, the control section 210 displays a screen on which an operation to the file can be selected on the display section 214 (Step S203). This screen provides reproduction, time stamp verification, time stamp verification of image at trigger and the like as file operation functions. When the user selects the image file and selects the operation processing for the file, the control section 210 detects the operation by the user and executes the corresponding processing (Step S204). A processing flow of time stamp verification is shown in FIG. 8B.

In the time stamp verification processing, the image management server 2 first decodes a hash value in the time stamp token using a public key and compares it with the hash value of a file to be verified (Step S311). When the hash values are determined as identical (Step S312: Yes), the control section 210 determines that there is no data alteration (Step S313), while if the hash values are determined to be different (Step S312: No), the control section 210 determines that the data has been altered (Step S314).

As mentioned above, by recording the image before and after the trigger occurrence, only the required image can be obtained. By storing the information identifying the trigger and other information in association with the image file, the desired image can be searched among the stored images. Particularly, by associating the time information indicating the trigger occurrence time with the information identifying the trigger as a key, the desired image can be searched based on the time information. Moreover, if the images are recorded in a time series, search is made easy and search time can be reduced. By making the time of the trigger occurrence as a key, the images photographed by a plurality of automated teller machines can be viewed at the same time, which improves convenience.

Moreover, since time stamp for a single frame at the trigger occurrence is applied, first, time stamping at a time closer to real time is enabled. In addition, accurate time is stamped on an image by a wave clock function. Since time stamp is applied for the entire image file, data validity is further guaranteed. Thus, crime prevention effects can be expected.

In this embodiment, the imaging device 100 transmits created image files and information relating to them to the image management server 2 each time the image information is made into a file. However, the image information files may be accumulated in the imaging device 100 to some extent by providing a large-capacity memory region made up of a hard disk or the like in the imaging device 100. And a function to download only required files from the imaging device 100 to the image management server 2 and to store them in the image DB 213a may be provided. It may be so configured that an administrator inputs a specific condition, searches an applicable file and stores the searched image file in the image management server 2 regularly (every morning or the like), for example. By this arrangement, the image files to be stored in the image management server 2 can be further narrowed down.

In this embodiment, detection of the operation of the automated teller machine 1 by a user is made as a trigger. Moreover, a temperature sensor or an illuminance sensor or the like may be provided at the imaging device 100 so that a detection signal upon detection by the sensor of a temperature above specified or illuminance below specified may be used as a trigger.

In this embodiment, time stamp is carried out for a frame image at the trigger occurrence and the entire image file, but the time stamp may be carried out only on the frame image at the trigger occurrence or only the entire image file.

This embodiment can be also applied to an intercom with camera. In this case, the imaging device 100 is provided with a doorbell pressing detector for detecting pressing-down of a doorbell. The imaging device 100 is installed at a position where the face of a visitor pressing down the doorbell can be photographed. When the visitor presses down the doorbell, the imaging device 100 uses the pressing down on the doorbell as a trigger and stores the image before and after the trigger occurrence. It is expected that the visitor faces the imaging device at least while the visitor is pressing down the doorbell. Thus, till the doorbell is responded, when the several frames of the image before and after the trigger are displayed on a screen of the indoor intercom, the figure of the visitor is displayed on the screen of the indoor intercom. When the user responds to the doorbell, display of several frames of the image before and after the trigger on the screen of the indoor intercom is released, and a real-time image is displayed. By storing the images before and after the pressing-down on the doorbell as above, the face of a person who pressed down the doorbell can be caught. Therefore, the present invention can be also used as a system against push-and-run of the doorbell. If the images before and after the trigger occurrence are stored in the image management server 2 with the association between the image file and the trigger occurrence time as in this embodiment, the image file can be searched by designating the trigger occurrence time as a search condition key.

The present invention in which time stamp is applied on trigger occurrence time itself with the association between the trigger event and the occurrence time of the trigger can be applied as in the following embodiment.

Second Embodiment

In a second embodiment, too, an image photographing system using a single imaging device similarly to the first embodiment will be described.

The invention according to Japanese Patent No. 3632707 is a device for automatically determining a foul using an image in a jumping event such as a long jump. This device photographs an image before and after an occurrence of a trigger by using a detection signal from a vibration/impact sensor mounted on a takeoff board as the trigger. Then, the device determines a foul from a photographed image. However, if a player takes off at a position where no vibration/impact is applied on the takeoff board, an image is not photographed by this device and a foul can not be determined in some cases. Moreover, if a player takes off at a position far from the takeoff board, an image is not photographed, so that distance to a takeoff position of the player from the takeoff board can not be measured. In this embodiment, a photographing system at takeoff for solving the problems is shown.

Figure 9:
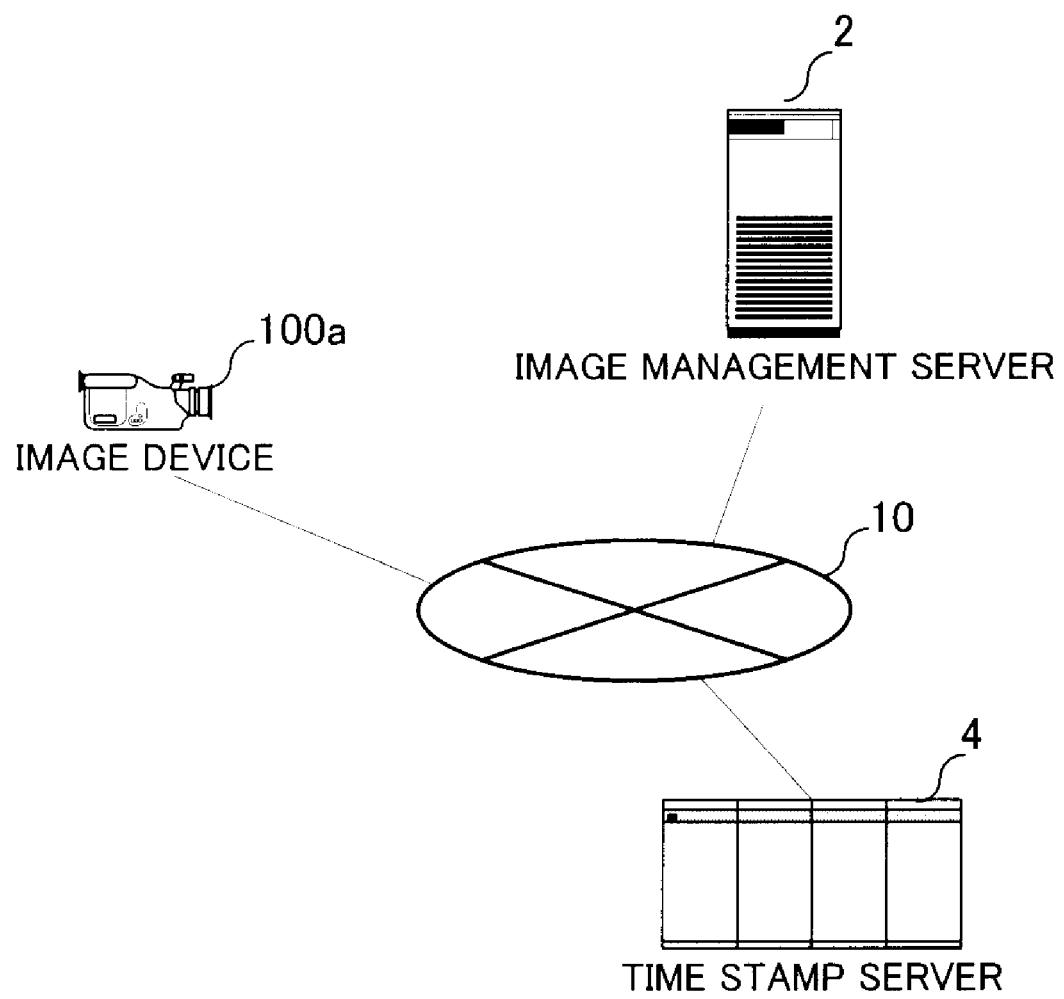
FIG. 9 is a diagram illustrating a configuration example of a system according a second embodiment.

FIG. 9 illustrates configuration of this photographing system. In FIG. 9, the same reference numerals are given to those with the same configuration as in FIG. 1. This system has an imaging device 100a installed beside the takeoff board, the image management server 2, the time stamp server 4, and the network 10. The imaging device 100a and the image management server 2 shares the configuration connected to each other through the network 10. Since those elements other than the imaging device 100a have the same configuration as in the first embodiment and detailed in the first embodiment, the description will be omitted.

However, in the second embodiment, the image file is stored in an image DB 213b having configuration different from that of the image DB 213a shown in FIG. 4. As shown in FIG. 11, the image DB 213b stores the image file, information to be a key for searching the image file (player numbers, the number of attempts, judgment results, takeoff distances and the like), the time stamp corresponding to the image file and the public key to decode the time stamp in association with each other as a single record.

Figure 10:
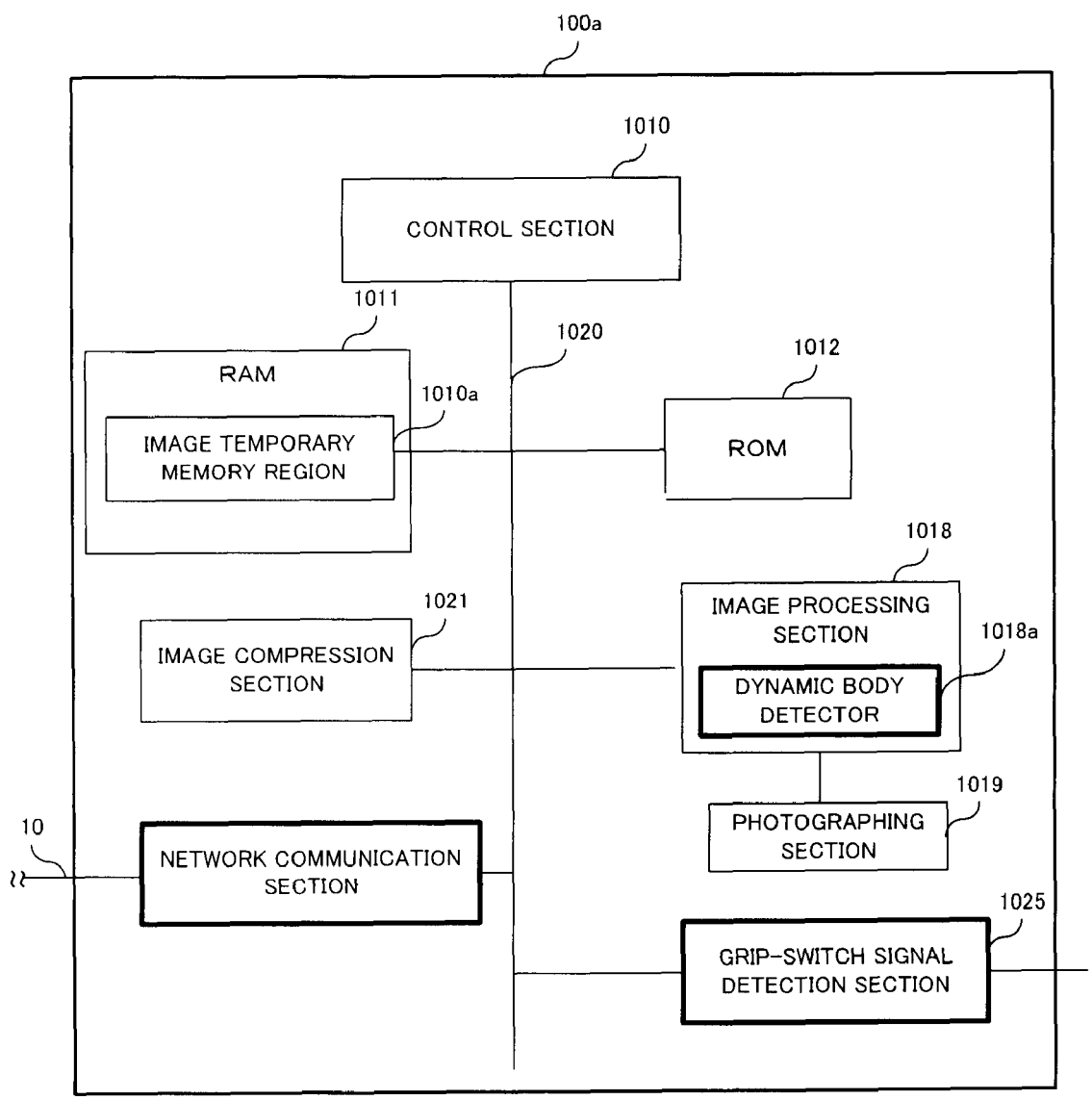
FIG. 10 is a diagram illustrating a configuration example of the imaging device according to the second embodiment.

Next, configuration of the imaging device 100a is shown in FIG. 10. In FIG. 10, those with the same configuration as in FIG. 2 are given the same reference numerals. The configuration of the imaging device 100a is the same as that of the imaging device 100 shown in FIG. 2 and has the control section 1010, the RAM (Random Access Memory) 1011 (including the image temporary memory region 1011a), the ROM (Read Only Memory) 1012, the image processing section 1018, the photographing section 1019, the bus 1020, and the image compression section 1021. Since they are detailed in the first embodiment, the description will be omitted. The imaging device 100a further has the network communication section 1017 shown by a bold frame, a moving body detection section 1018a, and a grip-switch signal detection section 1025.

The network communication section 1017 comprises the NIC (Network Interface Card) and the like and is provided with an interface to connect the imaging device 100a to the network 10. The imaging device 100a carries out communication on the basis of the TCP/IP protocol with the network 10 through the network communication section 1017. The network communication section 1017 may include a modem device, an infrared communicating device and the like.

The moving body detection section 1018a is a circuit for detecting a moving object by comparing images before and after image processing. The moving body detection section 1018a is included in the image processing section 1018 and when a jumper's foot taking a takeoff motion is photographed, a detection signal is transmitted to the control section 1010.

The grip-switch signal detection section 1025 is a circuit for detecting pressing-down of a grip switch connected to the outside by a judge.

Next, an operation of this system will be described.

First, the image temporary memory region 1011a temporarily stores the latest image data for predetermined a time while overwriting the past data all the time even in a state where no trigger has occurred as described in the first embodiment.

Figure 12:
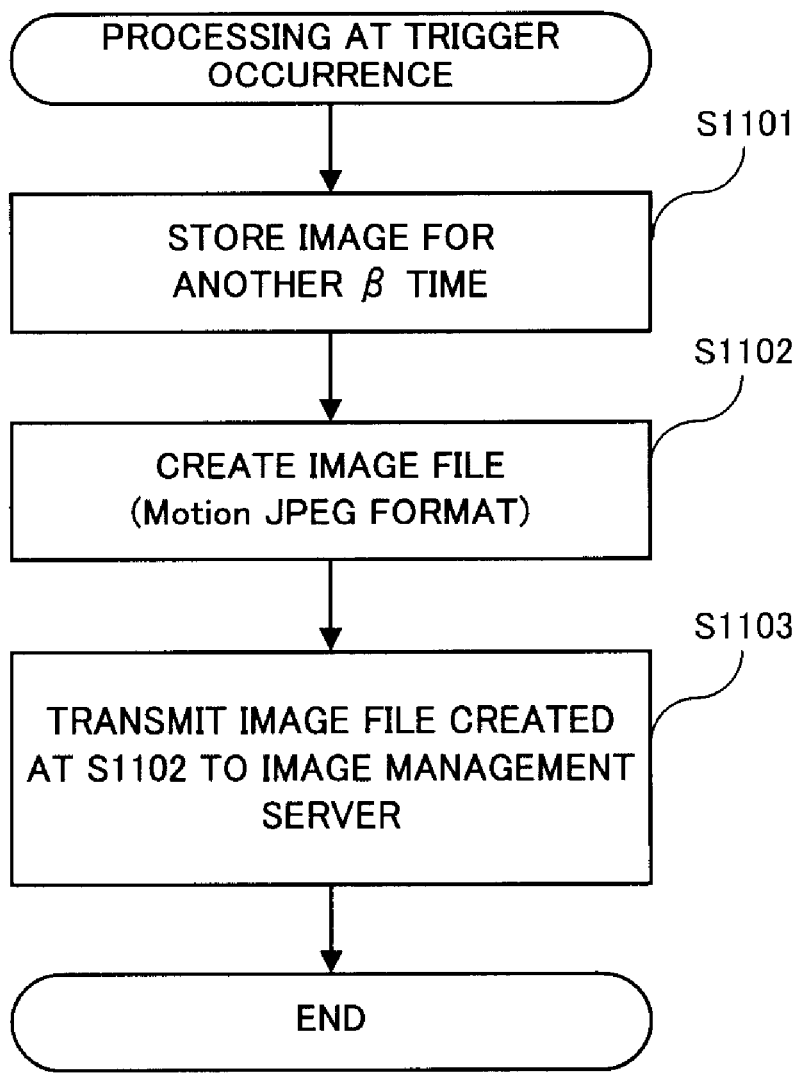
FIG. 12 is a flowchart illustrating an example of processing by the imaging device according to the second embodiment.

A flow from the detection of the trigger by the imaging device 100a to transmission of the image to the image management server 2 is shown in FIG. 12. In this system, there are two triggers: time when a judge determines that a jumper's foot has reached the takeoff board and presses down the grip switch or time when the moving body detection section 1018a detects a moving body, that is, a jumper's foot. However, the control section 1010 does not accept the subsequent trigger till specified β time has elapsed since the trigger occurred.

When the trigger occurs, the imaging device 100a stores an image in the image temporary memory region 1101a for another β time (Step S1101). When the image for β time is photographed, the control section 1010 sends the image data to the image compression section 1021, converts it in the Motion JPEG format and creates an image file (Step S1102). Then, the control section 1010 transmits the created image file to the image management server 2 (Step S1103).

Figure 13:
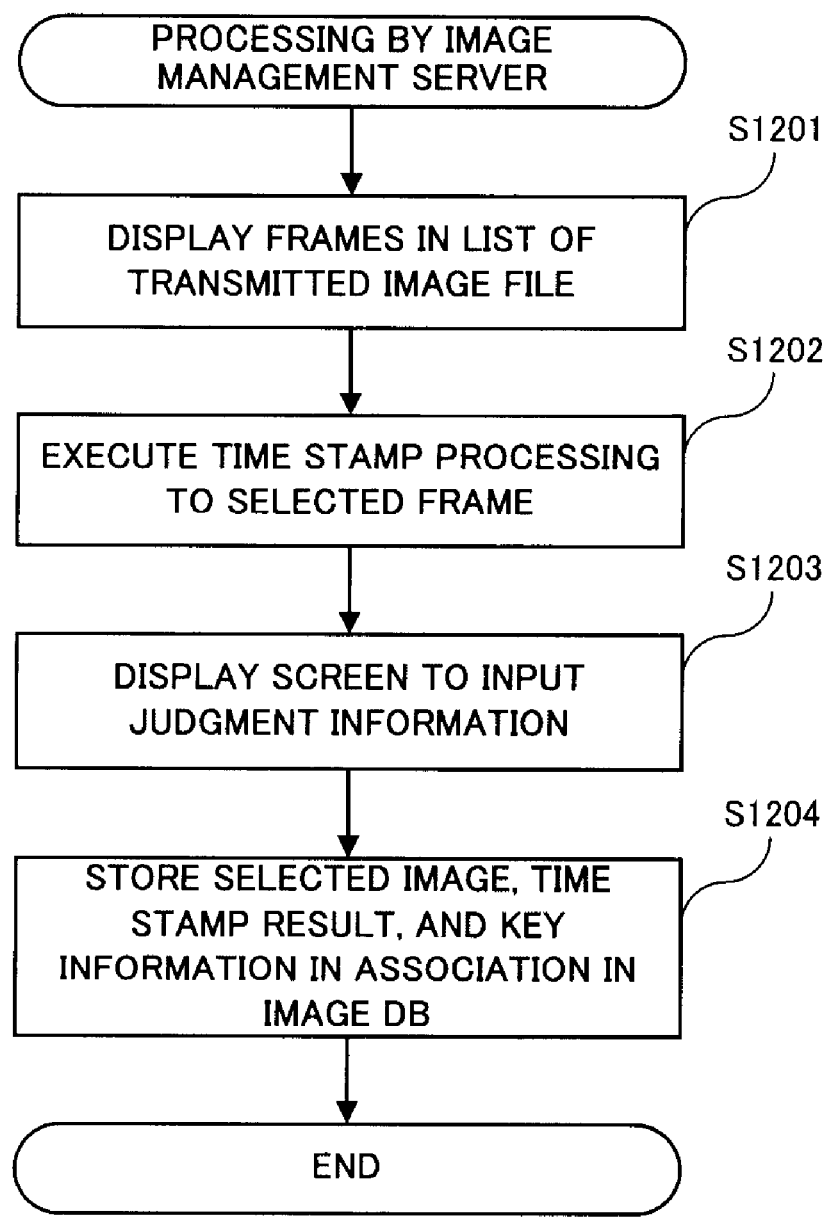
FIG. 13 is a flowchart illustrating an example of processing by the image management server according to the second embodiment.

The image management server 2 has an application program for carrying out processing on the transmitted image file. The control section 210 of the image management server 2 carries out the following operation shown in FIG. 13 according to this application program.

First, when the image file is received from the imaging device 100a, the control section 210 displays the frames of the transmitted image in a list around the frame at the occurrence of the trigger. At this time, the control section 210 displays the frames in a selectable manner (Step S1201). The image file transmitted from the imaging device 100a should include an image of a foot at a moment when a jumper, who has lately finished a jump, is going to take off. When a judge selects an image in which the foot at the moment of takeoff is photographed from the frames displayed in a list, the control section 210 detects the operation, associates the selected image with the time selected by the judge, and asks the time stamp server 4 to verify the time on it (Step S1202). At the same time, the control section 210 displays a screen to prompt the judge to input information such as a player number, the number of attempts, a takeoff judgment result, and a takeoff position (Step S1203). The judge makes judges based on the selected screen and when the judge inputs information on the screen, the control section 210 detects the input operation and time-stamps on the selected image according to the procedure described in the first embodiment. The control section 210 stores the selected image, the time stamp obtained by the processing at Step S1202, the public key and the inputted information in association with each other in the image DB 213b (Step S1204).

In the image management server 2, only required images are stored as above. The judge can make judges for takeoff, a distance to the takeoff position and the like by visually checking the images. Since the key information such as a player number is stored in association with the takeoff image, search of images is enabled later by designating the key information. Also, since time stamp is carried out, time when the judge makes judges can be recorded. Therefore, by checking it with the time when the player performs the attempt, the record can be used as non-altered judgment result.

In this embodiment, the pressing-down on the grip switch and a shot of the jumper are used as a trigger. It is needless to say that the trigger is not limited to them, but a sensor for detecting a human body such as a temperature sensor may be provided in the imaging device 100a so as to use a detection signal from such a sensor as a trigger.

Third Embodiment

In the first and second embodiments, each of those examples using a single imaging device is illustrated. In the present invention in which the information identifying a trigger is association with an occurrence time of the trigger and this is used as key information in search, images photographed by a plurality of imaging devices can be searched and viewed with the occurrence time of the trigger as key information. Such an application example will be described as a third embodiment.

In the third embodiment, a ski-jump flight distance judgment system using a plurality of imaging devices will be described. In this system, the plurality of imaging devices are installed with an equal interval and an area where a target travels is monitored. With this system, the target is tracked by photographing with a shot of the target as a trigger.

Figure 14A:
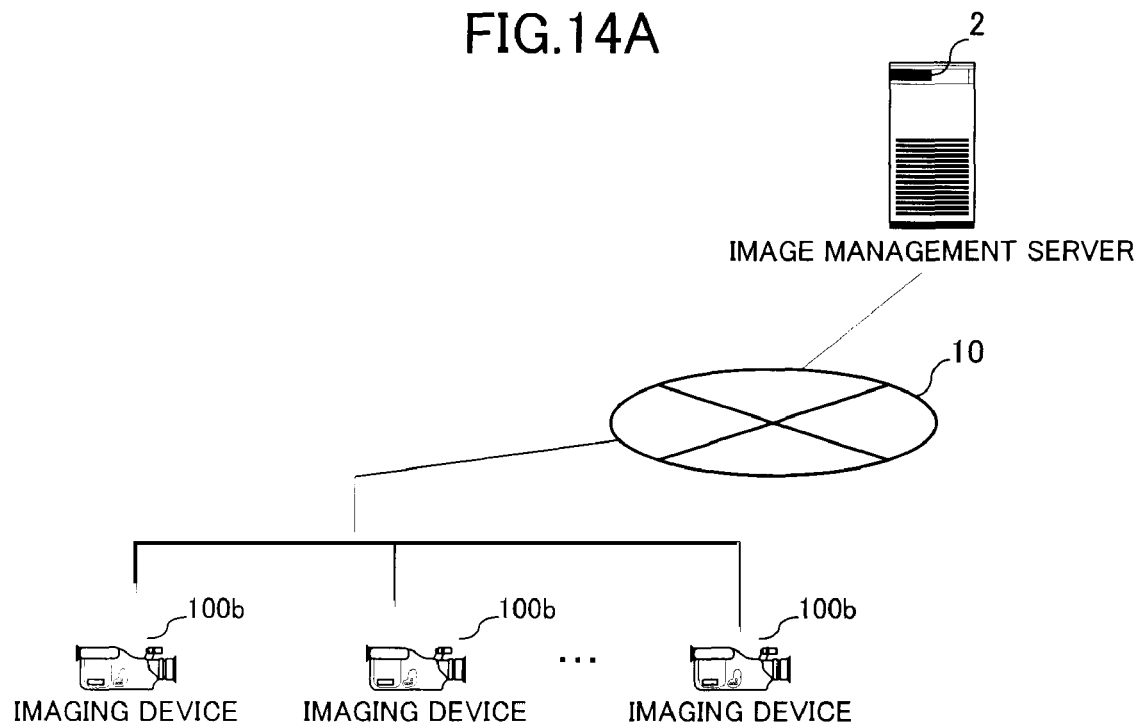
FIG. 14A is a diagram illustrating a configuration example of a system according to a third embodiment.

FIG. 14A shows configuration of the ski-jump flight distance judgment system. Since FIG. 14A has the configuration similar to that in FIG. 9, the same reference numerals are given to the same configuration in FIG. 14A as that in FIG. 9.

This system comprises a plurality of imaging devices 100b installed on a jump slope with an equal interval such as every 1 meter (See FIG. 14B), the image management server 2, and the network 10. The imaging device 100b and the image management server 2 are connected to each other through the network 10. The elements other than the imaging device 100b have the same configurations as those in the second embodiment, which are detailed in the second embodiment, therefore the description will be omitted.

However, the memory section 213 of the image management server 2 has configuration different from the first embodiment and is provided with a camera information DB 213c. As shown in FIG. 15, the camera information DB 213c is a database storing individual identification ID, which is associated with its installation position, to identify the imaging device 100b and its position information.

Figure 16:
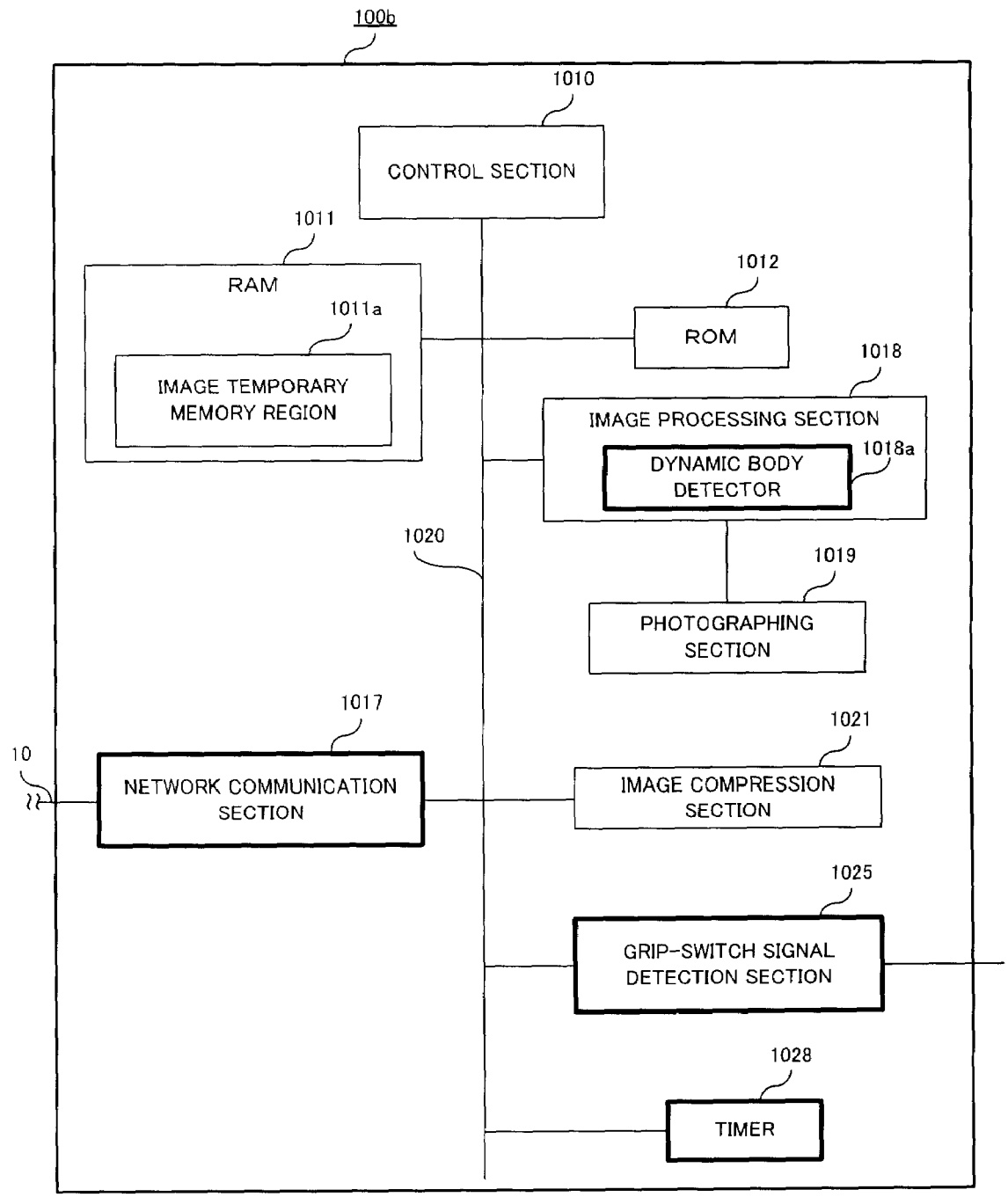
FIG. 16 is a diagram illustrating a configuration example of the imaging device according to the third embodiment.

As shown in FIG. 16, the imaging device 100b is similar to the components in the imaging device 100a according to the second embodiment shown in FIG. 10 except a timer 1028 shown by a bold frame. Thus, the same reference numerals are given to the same configuration in FIG. 16 as those in FIG. 10.

The timer 1028 is provided with an oscillation circuit and when a synchronization signal is received, the timer counts time from receipt of the synchronization signal.

Since the elements other than the timer 1028 are detailed in the first and second embodiments, the description will be omitted.

Figure 14B:
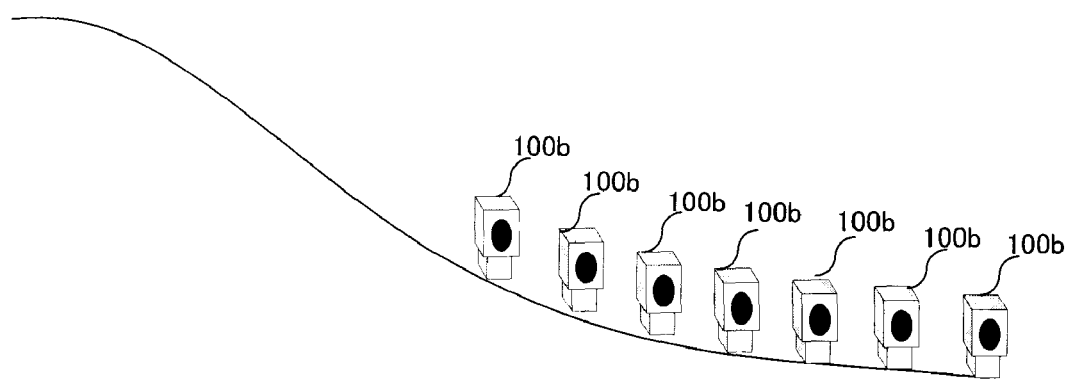
FIG. 14B is a diagram illustrating an arrangement example of the imaging device.

FIG. 14B shows a state view taken from the side of an example in which the imaging devices 100b are arranged in this embodiment. The imaging devices 100b are arranged with an equal interval and arranged to photograph the vicinity of the ground. FIG. 14B shows only an example of arrangement of the imaging devices 100*b* and the place or number of arrangement is not limited to that.

Next, an operation of this system will be described. In the system according to this embodiment, too, the image temporary memory region 1011*a* temporarily also stores the latest image data for predetermined α time while overwriting the past data all the time even in a state where a trigger has not occurred.

Then, a flow from detection of a trigger to transmission of an image file to the image management server 2 will be described.

Immediately before a jumper makes a landing or when it is determined that the jumper has landed, a judge presses down the grip switch. The grip-switch signal detection section 1025 of each imaging device 100*b* transmits a signal to each control section 210 when the pressing-down on the grip switch is detected. Each control section 210 resets the respective timers 1028, so that the imaging devices 100*b* are synchronized.

At the same time, when a signal from the grip-switch signal detection section 1025 is received, the control section 1010 counts a specified time (1 second, for example) from that point of time by the timer 1028. When the moving body detection section 1018*a* catches a jumping player within the specified time, the control section 1010 determines it as a trigger. However, as with the above embodiments, the control section 1010 does not accept the subsequent trigger till the specified time β has elapsed since occurrence of the trigger in this embodiment.

The imaging device 100*b* with the trigger occurrence among the imaging devices 100*b* detects this trigger, carries out the processing similar to that from Step S1101 to S1103 shown in FIG. 12 and transmits the stored image to the image management server 2. However, the imaging device 100*b* transmits the identification ID of the device and the timer time at the trigger occurrence as key information together with the image at Step S1103. When the image files are arranged in a direction of time axis on the basis of the timer time transmitted with the image file, movement of a jumper before and after landing can be tracked with time.

Figure 17:
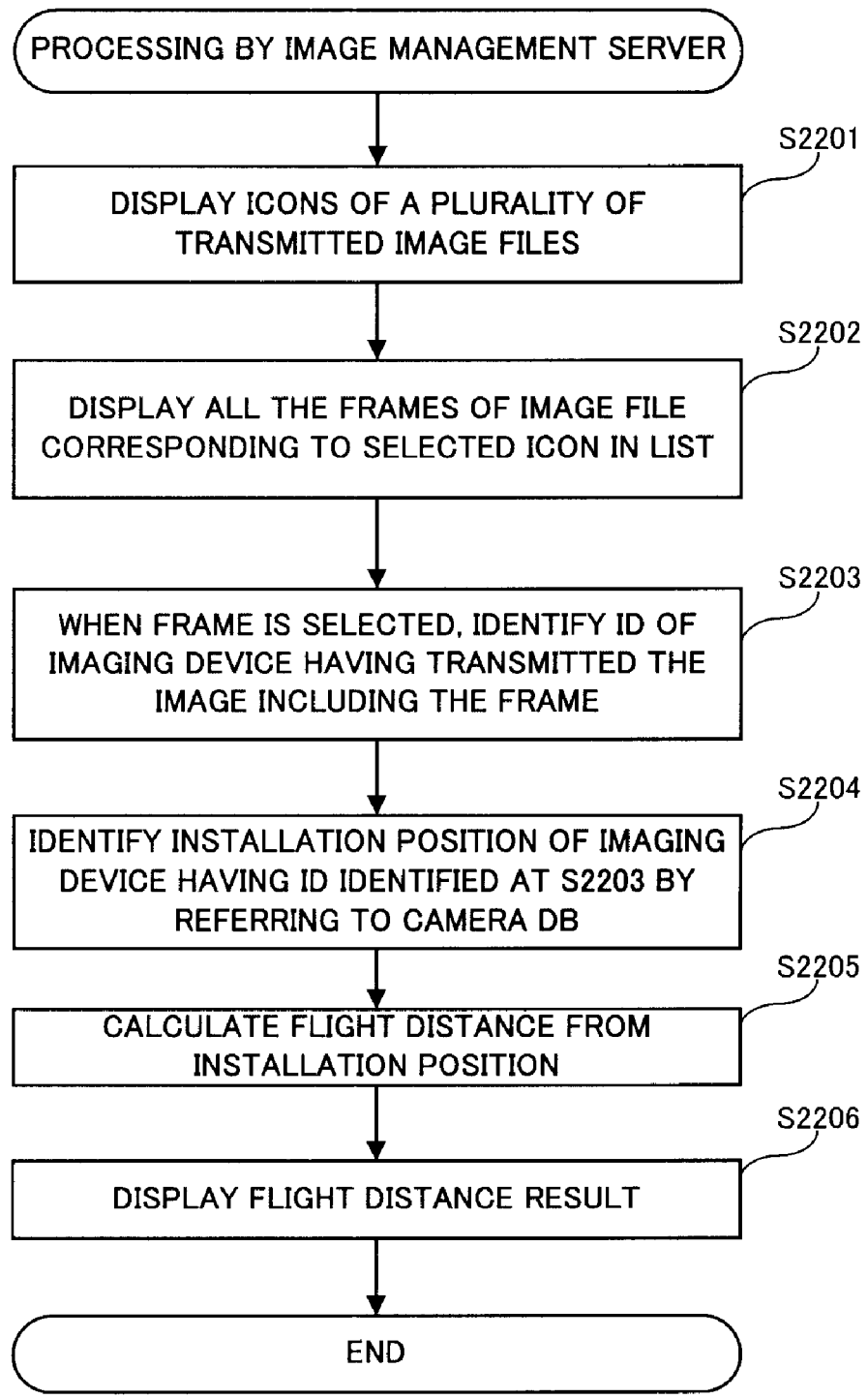
FIG. 17 is a flowchart illustrating an example of processing by the image management server according to the third embodiment.

Next, an operation of the image management server 2 will be described. The image management server 2 has a flight-distance measurement application program installed. By carrying out the processing shown in FIG. 17, the control section 210 of the image management server 2 according to this program measures the flight distance.

Each imaging device 100*b* transmits an image file including an image in which a person photographed when the grip switch was pressed down the last time is shown, to the image management server 2. When the image file is received from the imaging device 100*b*, the control section 210 of the image management server 2 creates a thumbnail of each image file and displays it on the display section 214 in a state capable of selection (Step S2201).

The displayed thumbnail is specifically an image displayed in a reduced manner of an image at a moment when the trigger occurs in each image file. The control section 210 arranges the thumbnails in the order of the timer time transmitted with the image file to the image management server 2 (that is, the time when the jumper is shot).

When a judge selects a thumbnail in which a moment of landing may be included from the thumbnails, the control section 210 displays all the frames of the image file around the frames before and after the trigger occurrence in a list on the display section 214 (Step S2202).

When the judge finds a frame including the moment of landing from the list display, selects the frame and presses down a flight-distance calculation button, the control section 210 of the image management server 2 detects the input by the judge and obtains an identification number of the imaging device 100*b* associated with the file including the frame designated by the judge (Step S2203). Then, the control section 210 refers to the camera information DB 213*c* from the individual identification number and identifies an installation position of the imaging device 100*b* (Step S2204). Then, the control section 210 calculates a flight distance from the installation position (Step S2205) and displays the calculation result on the display section 214 (Step S2206).

In this embodiment, by storing an image before and after the trigger, an image of landing of a player can be photographed as above. The individual identification ID of the imaging device 100*b* is transmitted with the image file to the image management server 2. Therefore, the image management server 2 can calculate a flight distance of a jumper from an installation position of the imaging device 100*b* that photographed an image of a moment of the landing. According to this embodiment, it is only necessary for a judge to select an image required for judgment from the images before and after landing, the images being arranged according to a time axis, and a workload can be reduced.

In this embodiment, in the image management server 2, the image file used for flight-distance judgment and information key for search (jumper's number, the number of attempts and the like as in the second embodiment) may be associated and stored in the memory section 213. If the key information is stored in association with the image file, an image can be searched by designating the key information later.

The ski-jump flight-distance judgment system can be applied to a distance judge of a landing point of a jumping event. For example, the imaging devices 100*b* are installed with an equal interval in a sand pit. Similarly to the flight-distance judgment system for ski jump, the imaging device 100*b* stores images before and after a trigger with a moment when a jumper is shot while the grip switch is pressed down as a trigger. Then, the image management server 2 identifies the imaging device that photographed the landing image from the stored images and calculates a jump distance.

Fourth Embodiment

In the third embodiment, movement of a single target is tracked using a plurality of imaging devices. In this embodiment, a security support system for monitoring different areas using a plurality of imaging devices will be described.

If an accident occurs when a small number of securities stand guard, images photographed by a plurality of monitor cameras installed in a facility are used to grasp a situation of the accident. However, it takes time and labor to extract an image with the situation of the accident from images continuously photographed by the plurality of monitor cameras. This embodiment solves the problem and records only required images.

Figure 18A:
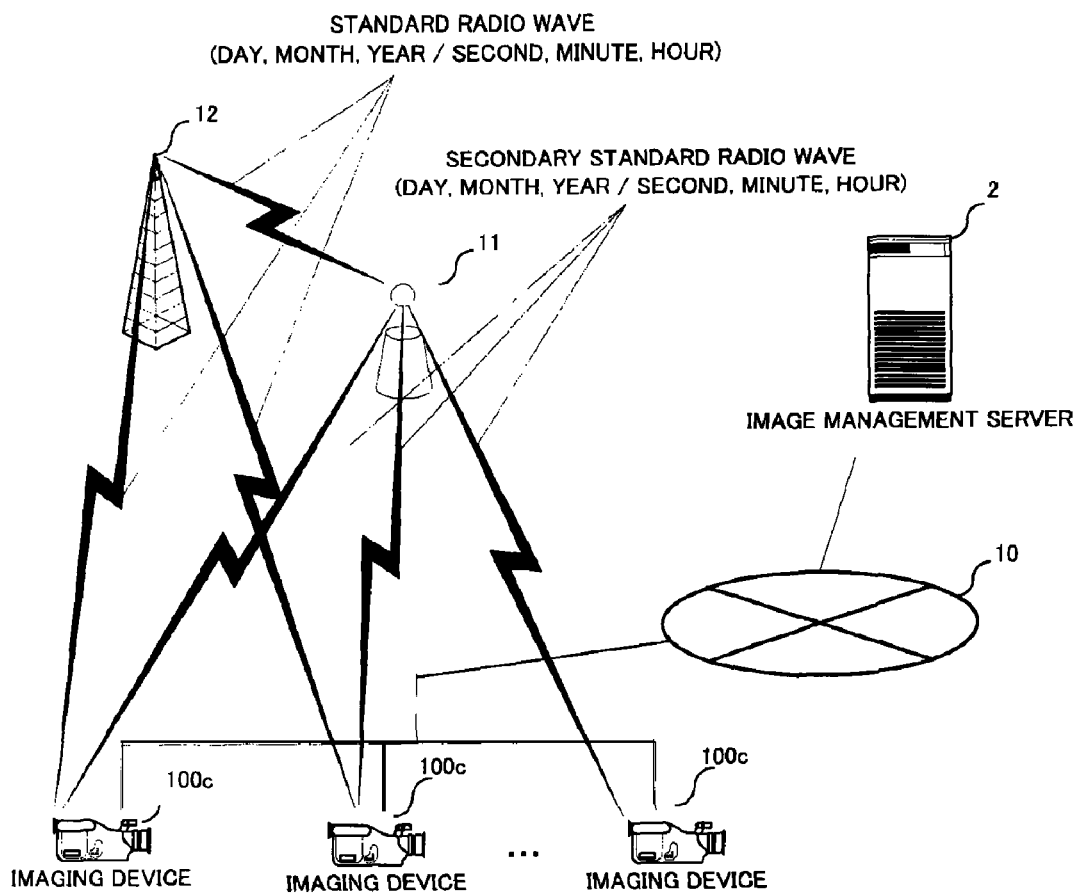
FIG. 18A is a diagram illustrating a configuration example of a system according to a fourth embodiment.

Configuration of this security support system is shown in FIG. 18A. Since FIG. 18A is similar to the configuration shown in FIG. 9, the same reference numerals are given to the same configuration.

This system comprises a plurality of imaging devices 100*c* installed in a building so that there is no blind corner, the image management server 2, the network 10, the relay machine 11, and the radio tower 12. The imaging device 100*c* and the image management server 2 are connected to each other through the network 10. The imaging device 100*c* receives the secondary standard wave including the standard time information from the relay machine 11. Since each element has the same configuration as the first embodiment and is detailed in the first embodiment except the imaging device 100c, the description will be omitted.

However, the memory section 213 of the image management server 2 has a different configuration from the embodiment described above and is provided with an image DB 213d. As shown in FIG. 19, the image DB 213d associates the image file in the Motion JPEG format with the key information indicating the trigger occurrence time when the image file was photographed and stores them in a single record.

Figure 18B:
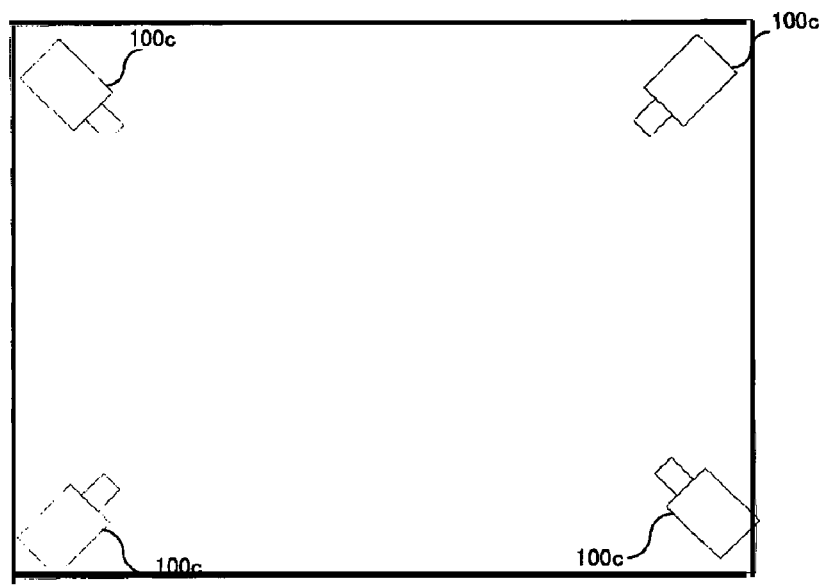
FIG. 18B is a diagram illustrating an arrangement example of the imaging device.

FIG. 18B illustrates an example of arrangement of the imaging devices 100c viewed from above. FIG. 18B is an example of arrangement of the imaging devices 100c, and a place or the number of arrangement is not limited to this arrangement example.

Figure 20:
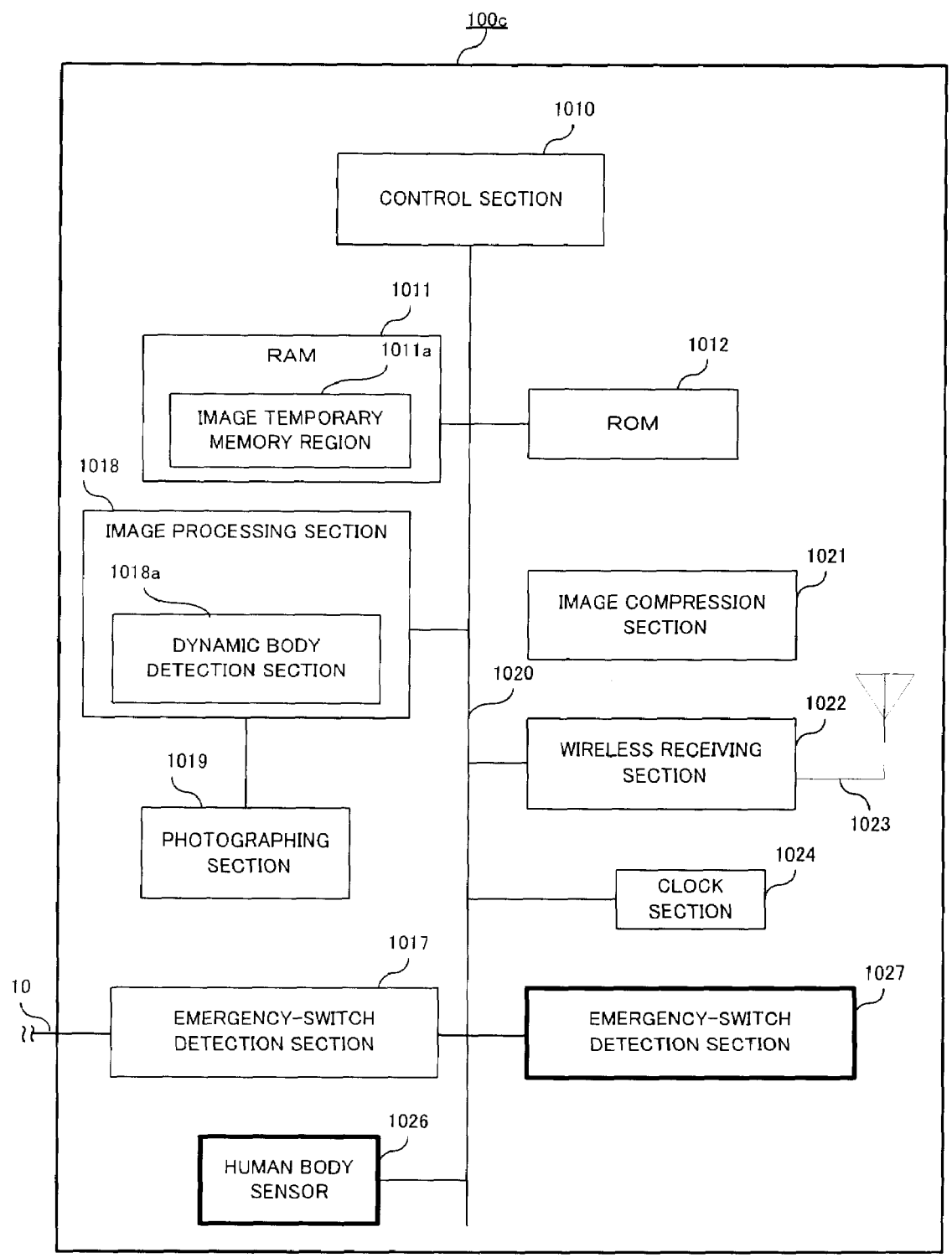
FIG. 20 is a diagram illustrating a configuration example of the imaging device according to the fourth embodiment.

Next, the configuration of the imaging device 100c is shown in FIG. 20. The imaging device 100c is provided with the configuration similar to that of the imaging device 100a described in the second embodiment. Thus, the same reference numerals are given to the same configuration as in FIG. 10.

The imaging device 100c comprises, similar to the imaging device 100a shown in FIG. 10, the control section 1010, the RAM (Random Access Memory) 1011 (including the image temporary memory region 1011a), the ROM (Read Only Memory) 1012, the network communication section 1017, the image processing section 1018, the photographing section 1019, the bus 1020, the image compression section 1021, the wireless receiving section 1022, the antenna 1023, and the clock section 1024. Since these members are detailed in the second embodiment, the description will be omitted. In addition to them, the imaging device 100c is provided with a human body sensor 1026 shown by a bold frame and an emergency-switch signal detection section 1027.

The human body sensor 1026 is a sensor circuit comprising a temperature sensor, an infrared sensor or the like, and detects a human when a person approaches and supplies a detection signal.

The emergency-switch detection section 1027 is a circuit for detecting that an emergency switch is turned on. The emergency switch is distributed to each security guard. When the security guard lets go the emergency switch, the emergency switch is brought into an ON state and generates a faint signal. The emergency switch detection section 1027 detects the faint signal and notifies it to the control section 1010. When the notification is received, the control section 1010 also notifies the detection of the emergency switch signal to other imaging devices 100c through the network 10.

Next, an operation of this system will be described. First, in this embodiment, too, the image temporary memory region 1011a temporarily stores the latest image data for predetermined a time while overwriting the past data all the time even in a state where no trigger has occurred, as described in the above embodiments.

Next, a flow from when the control section 1010 of the imaging device 100c detects a trigger till when it transmits the image file to the image management server 2 will be described.

When the human body sensor 1026 detects a person and the emergency-switch signal detection section 1027 detects that the emergency switch has been turned on, the control section 1010 of the imaging device 100c determines it as an occurrence of a trigger event. However, as in the above embodiments, the subsequent trigger is not accepted till a specified β time has elapsed since the occurrence of the trigger in this embodiment, either.

When a trigger occurs, the control section 1010 carries out the processing from Step S1101 to S1103 shown in FIG. 12 as in the second embodiment and transmits the image data to the image management server 2. However, the trigger occurrence time is transmitted with the image file at Step S1103. After a series of processing, to the image management server 2, only the image of the imaging device 100c catching the person when the emergency switch was turned on, that is, the imaging device 100c in which the trigger occurred is transmitted with related information.

Figure 21:
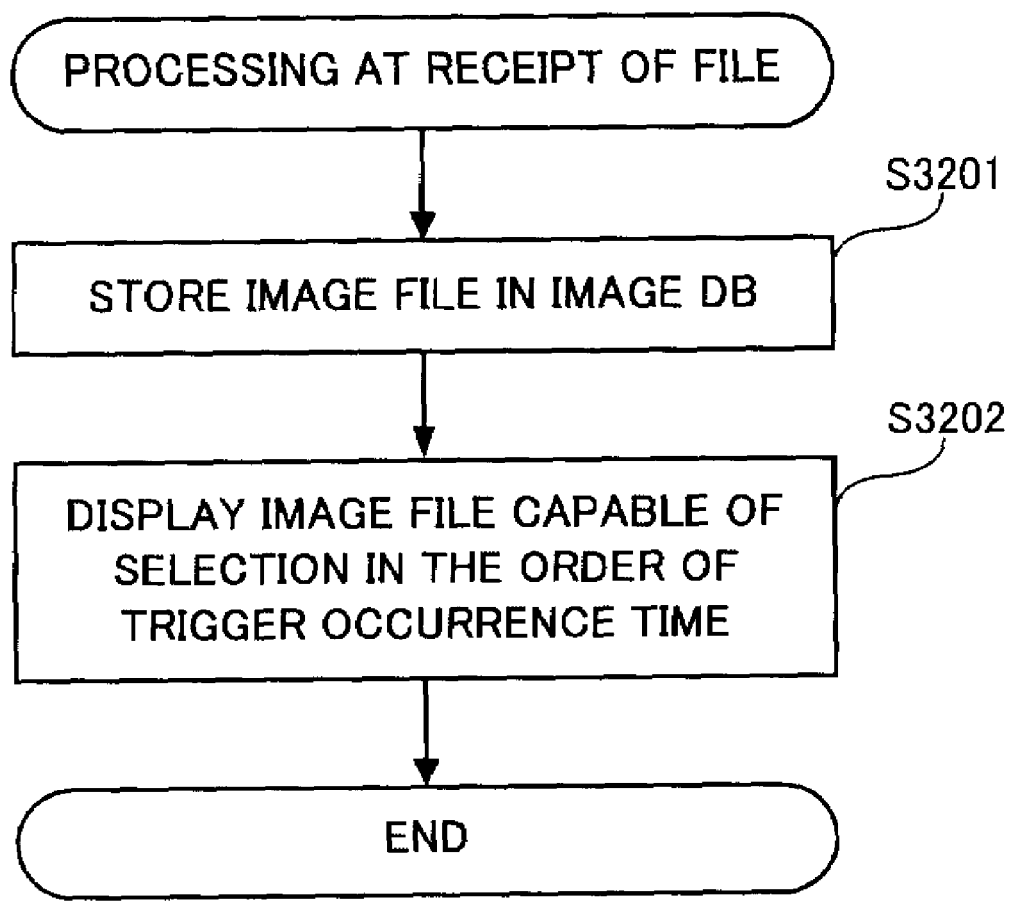
FIG. 21 is a flowchart illustrating an example of processing by the image management server according to the fourth embodiment.

Next, an operation of the image management server 2 will be described. The image management server 2 is a server arranged at a security center or the like. In the image management server 2, an application program for operating the image file transmitted from the imaging device 100c is installed. The image management server 2 carries out the processing shown in FIG. 21 according to the program.

When the image file is received from the imaging device 100c, the control section 210 of the image management server 2 stores the received image file in association with the trigger occurrence time in the image DB 213d (Step S3201). The control section 210 displays a thumbnail showing the received image file in a state capable of selection in the order of trigger occurrence time, on the display section 214 (Step S3202). The thumbnail displays an image at the trigger occurrence of the image file in a reduced manner similarly to the third embodiment. The thumbnail includes an individual identification ID of the imaging device 100c so as to discriminate which imaging device 100c photographs the image.

On the other hand, when an administrator selects the thumbnail of the image file as needed, the control section 210 detects the selection and reproduces the image file corresponding to the thumbnail on the display section 214.

As above, according to this embodiment, an image catching a person when the emergency switch was turned on is stored. By storing the trigger occurrence time and the individual identification ID of the imaging device 100c as a key associated with the image, past images can be searched.

Since only the image catching the person is recorded when the emergency switch is turned on, the labor by the administrator to grasp the situation at the accident from recorded images is reduced.

Also, since all the plurality of imaging devices 100c are provided with the human body sensors, even if there are a plurality of illegal intruders, photographed images for all the bodies of them are stored, which is also an advantage.

In the image management system of this embodiment, an alarm function to notify an abnormality to the outside by an alarm sound may be further provided when the control section 210 of the image management server 2 receives an image file from the imaging device 100c.

This embodiment can be also applied to accident monitoring at a work site with a small number of people in a plant or a warehouse. If the number of people is large, a situation at an occurrence of an accident can be grasped by workers around, but with a small number of people, they are not necessarily present in a range capable of being visually checked by another person.

In this case, a sensor for detecting an impact such as an acceleration sensor is distributed to workers to hold it. The worker holds this sensor by mounting it on a hard hat or the like to be worn, for example. On the other hand, the imaging device 100c is provided with an acceleration-sensor signal detection section that detects a signal from the acceleration sensor. Also the imaging devices 100c are installed at the work site so that there is no blind spot.

Triggers to be a clue to transmit an image file by the imaging device 100c to the image management server 2 includes the following two types: one type of the triggers is that the human body sensor 1026 of the imaging device 100*c* detects a human body and the acceleration sensor is turned on; and the other is that the acceleration-sensor signal detection section detects a signal from the acceleration sensor and the emergency-switch signal detection section 1027 detects that the emergency switch has been turned on.

Moreover, the image management system according to this embodiment can be also applied to use for supporting elderly people living alone. The elderly person shall mount an acceleration sensor on his/her belongings such as a lucky charm to carry it with him/her. On the other hand, the imaging device 100*c* is provided with an acceleration-sensor detection section for detecting a signal from the acceleration sensor. And the imaging device 100*c* is installed in a house or an apartment house where the elderly person lives so that no blind spot is generated.

A trigger to be a clue for the imaging device 100*c* to transmit an image file to the image management server 2 is similar to the above accident monitoring system at a work site, which are the following two. One of them is when the human body sensor 1026 of the imaging device 100*c* detects a human body and the emergency switch is turned on. The other is when the acceleration-sensor signal detection section detects a signal from the acceleration sensor and the emergency-switch signal detection section 1027 detects that the emergency switch has been turned ON. In this system, since the image file is not transmitted to the image management server 2 till the emergency switch is turned on, the image is not recorded in the image management server 2 all the time. Therefore, it has an advantage that privacy is difficult to be violated.

This embodiment can be also applied to line judgment of "IN" or "OUT" in sports such as tennis, volleyball and the like.

In this case, the imaging devices 100*c* are installed at each line for monitoring the lines. The imaging device 100*c* is provided with the grip-switch signal detection section 1025 provided in the imaging device 100*a* according to the second embodiment instead of the human body sensor 1026 and the emergency-switch signal detection section 1027.

In the line judgment, a trigger to be a clue for the imaging device 100*c* to create an image file occurs when the following conditions are satisfied. That is, when the moving body detection section 1018*a* detects that a ball has been photographed while the grip-switch signal detection section 1025 of the imaging device 100*c* is detecting that the judge has pressed down the grip switch. Only the image file that caught a moving ball is transmitted from the imaging device 100*c* to the image management server 2 while the grip switch is being held down. It is only necessary for the judge to check the images before and after the trigger among the images, and therefore time for judgment can be reduced.

Fifth Embodiment

In the fourth embodiment, different areas are monitored using a plurality of imaging devices. In this embodiment, a sport video review system in which a single target is monitored from different angles with a plurality of imaging devices will be described.

In sports such as American football, soccer, basketball, ice hockey and the like in which a plurality of players participate, images catching play of the same player from a plurality of different viewpoints are in demand for judgment (foul, assist, goal judgments and the like) and for photographing more vivid images. This embodiment provides a system that can satisfy the demands.

Figure 22A:
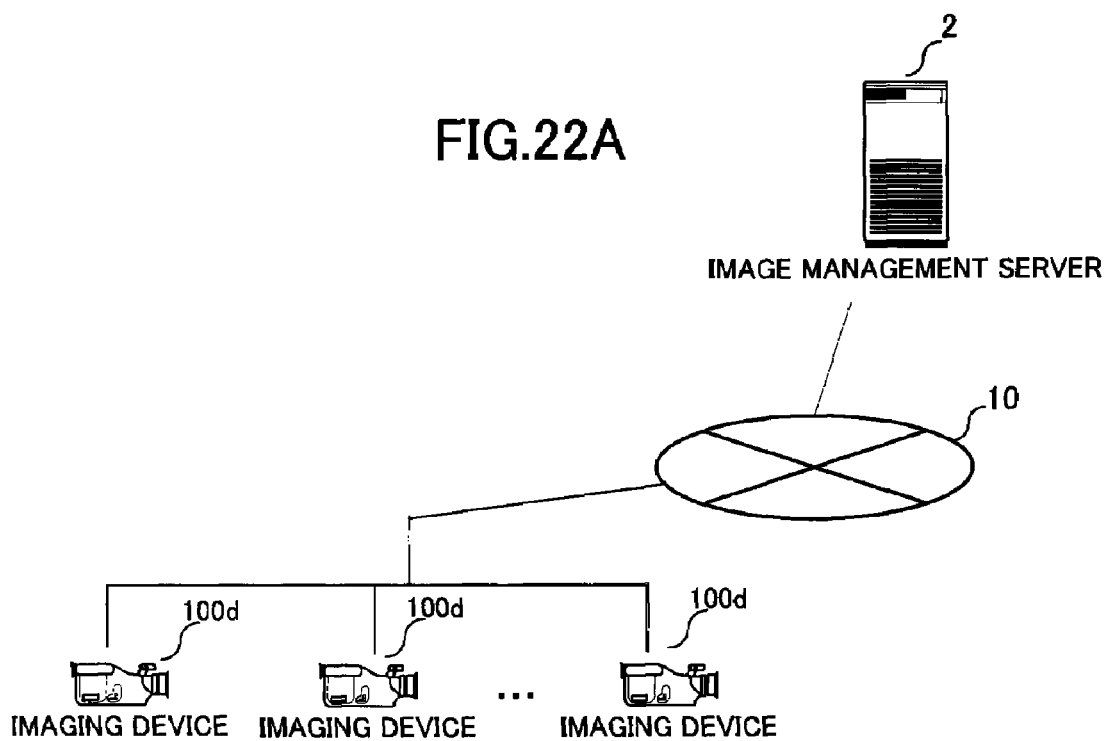
FIG. 22A is a diagram illustrating a configuration example of a system according to a fifth embodiment.

FIG. 22A shows a configuration of a sport video review system. The configuration of the sport video review system is similar to the configuration shown in FIGS. 9 and 14A and comprises imaging devices 100*d* installed with an equal interval on a ground, a court or the like, the image management server 2, and the network 10. Among the components shown in FIG. 22A, the network 10 has the same configuration as those in the second to fourth embodiment, which has been detailed, and the description will be omitted.

Figure 22B:
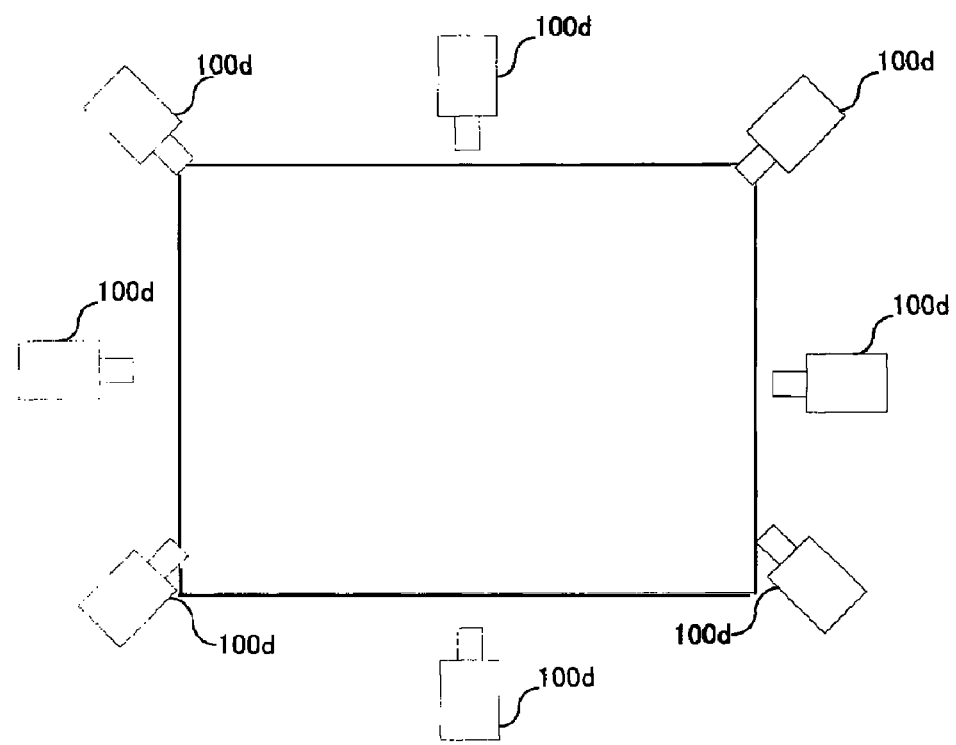
FIG. 22B is a diagram illustrating an arrangement example of the imaging device.

FIG. 22B shows an example of arrangement of the imaging devices 100*d* viewed from above. FIG. 22B shows an arrangement example of the imaging devices 100*d*, and the place and number of arrangement is not limited to that.

Next, the image management server 2 and the imaging device 100*d* will be described.

The memory section 213 of the image management server 2 is provided with the camera information DB 213*c* similarly to the third embodiment and stores an installation position of the imaging device 100*d* having an individual identification ID using the individual identification ID of the imaging device 100*d* as a key.

Moreover, the memory section 213 of the image management server 2 is provided with an image DB 213*e* storing image files as shown in FIG. 23. The image DB 213*e* stores the trigger occurrence time when the image was photographed, the individual identification ID of the imaging device 100*d* having photographed the image, a direction of the camera in the case of a master camera, and distance information to a photographic object in association with the image file as a single record.

Figure 24:
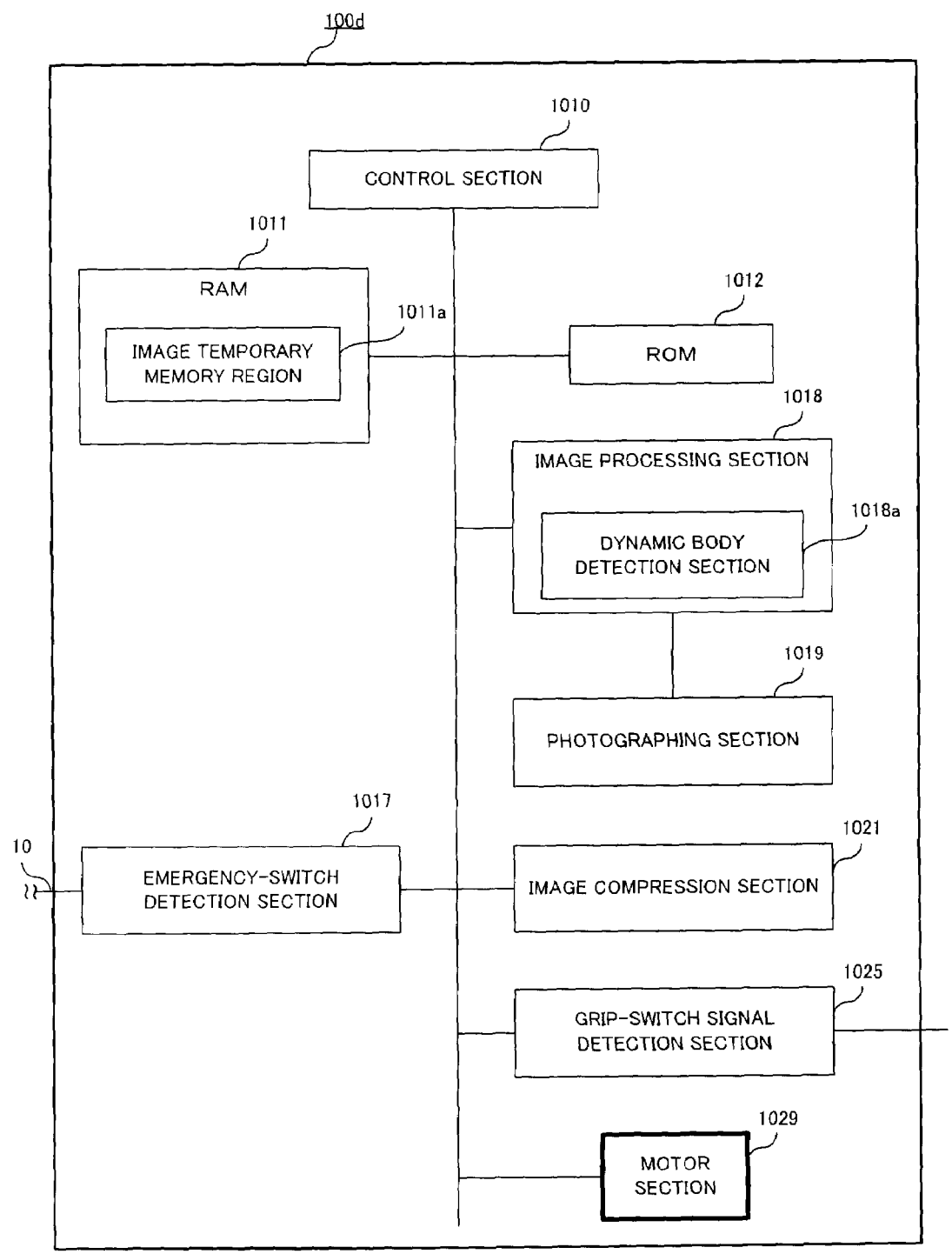
FIG. 24 is a diagram illustrating a configuration example of the imaging device according to the fifth embodiment.

As shown in FIG. 24, the imaging device 100*d* is substantially the same as the imaging device 100*a* according to the second embodiment but is different in a point that it is provided with a motor section 1029 shown by a bold frame. The motor section 1029 controls the direction of the imaging device 100*d* according to a control signal from the control section 1010. A program installed in the image management sever 2 asks the control section 1010 of each imaging device 100*d* to control the motor section 1029 so that one of the imaging devices 100*d* functions as a master camera. Also, all the other imaging devices 100*d* are controlled so as to interlock with the master camera and photograph the same target as that of the master camera.

The interlocking method between the master camera and slave cameras will be described below. The image management server 2 obtains the direction where the master camera is taking a picture and information relating to a distance to the photographic object through the network 10. The direction of the master camera is calculated from such as an angle from a reference position to which the motor section 1029 rotates the camera, and the distance information to the photographic object is calculated from such as a lens position.

On the basis of the direction of the master camera, the distance information to the photographic object and the installation position of the master camera stored in the camera information DB 213*c*, the control section 210 calculates an area where the master camera is taking a picture. The control section 210 refers to the camera information DB 213*c* and calculates the angle at which each imaging device 100*d* of each imaging device 100*d* should be oriented to photograph the calculated area and the lens position. The calculated result is transmitted to each imaging device 100*d* through the network 10. The control section 1010 of each imaging device 100*d* changes the direction of each imaging device 100*d* by controlling the motor section 1029 based on the received information. Also, the control section 1010 changes the lens position by controlling the photographing section 1019 for focusing or zooming.

Next, an operation of this system will be described. In this embodiment, similarly to the above embodiments, the image temporary memory region 1011*a* also temporarily stores the latest image data for predetermined α time while overwriting the past data all the time even if a trigger has not occurred.

Next, a flow from when the imaging device 100*d* detects a trigger till when the image management sever 2 stores the image file will be described.

When the judge presses down the grip switch, it makes a trigger and each imaging device 100*d* including a master and slaves carries out the processing similar to Step S1101 to Step S1103 shown in FIG. 12 and transmits a photographed image to the image management server 2. However, at Step S1103, the individual identification ID of the imaging device 100*d* as key information associated with the image is transmitted with the image file. The image file of the image photographed by the master camera is further added with the direction of the master camera at the trigger occurrence and information on the distance to the photographic object and transmitted. Similarly to the above embodiments, the control section 1010 does not accept the subsequent trigger till specified β time has elapsed since occurrence of the trigger, either, in this embodiment.

In the above processing, the image management server 2 receives the image files of the images for several seconds before and after the occurrence of the last trigger (when the grip switch is pressed down) and related information from each of the plurality of imaging devices 100*d*.

Figure 25:
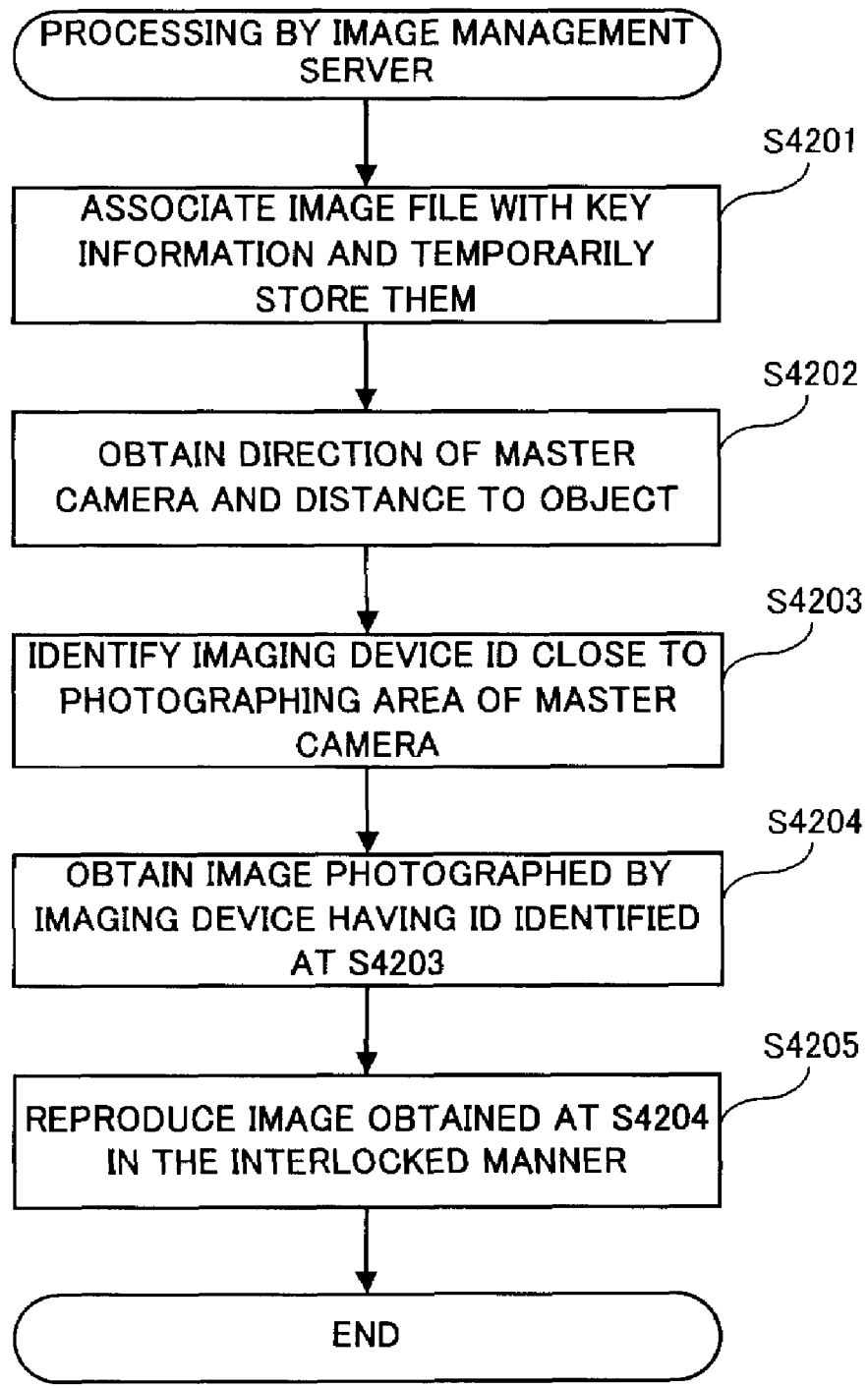
FIG. 25 is a flowchart illustrating an example of processing by the image management server according to the fifth embodiment.

Next, an operation of the image management server 2 will be described. In the image management server 2, an image reproduction application program is installed. The control section 210 executes the operation shown in FIG. 25 according to this program when an image is transmitted from the imaging device 100*d*. The control section 210 reproduces the images from each imaging device 100*d* at the same time centered on the camera close to the area caught by the master camera in an interlocked manner.

Specifically, first, the control section 210 associates the image file with key information and temporarily stores them (Step S4201). Then, from among data temporarily stored at Step S4201, the information associated with the specific identification ID of the master camera is referred to, and the direction of the master camera and information on the distance to the photographic object are obtained (Step S4202). Then, the control section 210 refers to the camera information DB 213*c* and identifies the individual identification ID of some imaging devices 100*d* installed at positions close to the area photographed by the master camera from the direction of the master camera and the distance to the photographic object obtained previously (Step S4203). Then, the control section 210 identifies the image file of the image photographed by the imaging device 100*d* having the specific identification ID from among the image files temporarily stored at Step S4201 (Step S4204). And the control section 210 reproduces images in the interlocked manner centered on the camera close to the area caught by the master camera (Step S4205).

As above, images for several seconds before and after the time when the grip switch is pressed down are photographed by the plurality of cameras, and the images can be reproduced in the interlocked manner centered on the camera close to the area caught by the master camera.

This embodiment, as the above embodiment, may be provided with a function to store image files transmitted from the imaging device 100*d* in the image DB 213*e* and search. In this case, the image management server 2 is provided with a clock section for timing time and the grip-switch signal detection section 1025. The image management server 2 stores the image file, the individual identification ID of the imaging device, and the trigger occurrence time detected by the image management server 2 (time when the grip switch is pressed down), and in the case of an image from the master camera, the direction of the master camera and the distance information to the photographic object in association with each other.

During search, the control section 210 refers to the image DB 213*e* using the time when the grip switch is pressed down as a search condition. The image files photographed by each of the imaging devices 100*d* at the same time when the grip switch is pressed down are stored in association with the same grip switch pressed-down time. Therefore, by storing the grip switch pressed-down time in the image DB 213*e*, a series of images photographed at the same grip switch pressed-down time can be obtained from the image DB 213*e* using the time as a key. By designating the grip switch pressed-down time and carrying out Steps S4201 to S4205 for the searched series of images, the image photographed by the interlocked camera centered on the camera close to the area caught by the master camera can be reproduced.

As mentioned above, in the various embodiments of the present invention, the image files of the images before and after the trigger occurrence and key information relating to the images are associated and stored. By varying the event to be a trigger according to the use, only a required image can be photographed. Also, by making a search based on the key information, required information can be taken out promptly from the stored images.

The various embodiments of the present invention have been described above, but modification and application in various forms are possible in putting the present invention into practice and not limited to the above embodiments.

For example, the trigger and the key information may be changed as necessary. Similarly, the length of an image to be stored in the image temporary memory region 1011*a*, the length of the image photographed before and after the trigger, and frame rate photographed by the photographing section 1019 may be also changed as necessary.

In the above embodiments, the application on the image management server 2 is operated from the image management server 2 but it may be accessed from a terminal connected to the network.

When the time of the clock section is to be corrected in the embodiments described above, the standard wave including the standard time information is received to correct the time, but time correcting method is not limited to that. For example, if each imaging device is connected through the network, the time may be corrected through the network. Also, the time may be corrected by synchronization with an atomic clock on a GPS satellite.

The image management server 2 according to the embodiments above may be realized by a dedicated hardware instead of a usual computer server.

Moreover, in the above embodiments, the control programs of the image management server 2, the imaging devices 100 and 100*a* to 100*d* are described to be stored in a memory or the like in advance. However, the image management server 2, the imaging devices 100 and 100*a* to 100*d* may be provided with any suitable reading device for a recording medium such as a flexible disk, CD-ROM (Compact Disk Read-Only Memory), DVD (Digital Versatile Disk), MO (Magneto-Optical disk), USB (universal serial bus) memory so that the control program is stored and distributed in the recording medium which can be read by the reading device. And an apparatus for executing the above processing operation may be configured by installing the program.

Alternatively, the control program may be stored in a disk device or the like provided at a predetermined server on the communication network so that the control program is downloaded or the like to the image management server 2, the imaging devices 100 and 100*a* to 100*d*. Moreover, the above processing can be also achieved by starting and executing the program while transferring it through the communication network.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

The present application is based on Japanese Patent Application No. 2007-011546 filed on Jan. 22, 2007. The specification, claims, and entire drawings thereof are incorporated herein by reference.

INDUSTRIAL APPLICABILITY

The present invention can be used for an imaging device such as a monitoring camera.

What is claimed is:

1. An image information management system comprising:
an imaging device and an image information storage device connected to said imaging device through a network,
said imaging device including:
a trigger event detecting section which detects an occurrence of a trigger event;
a photographing section which photographs images continuously;
an image memory section which stores images photographed within a first predetermined time period before current time, and when the occurrence of a trigger event is detected by said trigger event detecting section, maintains the images photographed within the first predetermined time period before the trigger event occurs and stores images photographed by said photographing section within a second predetermined time period after the trigger event occurs;
a first time stamp section which, when the occurrence of a trigger event is detected by said trigger event detecting section, asks a time stamp processing device connected through the network for time stamp processing of a compressed frame at trigger created by space compression of a latest frame of the images stored in said image memory section at the occurrence of the trigger event so as to obtain a time stamp of a time stamp result;
an image file creating section that, when the occurrence of a trigger event is detected by said trigger event detecting section, awaits until the second predetermined time period lapses, and then creates an image file having a series of compressed frames created by space compression of the respective frames of the images stored in said image memory section; and
a second time stamp section which asks said time stamp processing device connected through the network for time stamp processing of the image file created by said image file creating section so as to obtain a time stamp of a time stamp result; and said image information storage device including:
an image information memory section which obtains the image file created by said image file creating section from said imaging device and stores the image file, key information associated with the image and the time stamps obtained by said first time stamp section and said second time stamp section, the key information including information relating to timing of the occurrence of the trigger event.

2. The image information management system according to claim 1, wherein said imaging device further comprises:
a clock section which counts time;
a standard time information receiving section which receives standard time information; and
a time adjusting section which adjusts said clock section on the basis of the standard time information received by said standard time information receiving section, wherein said image information memory section stores the time counted by said clock section in association with the image file created by said image file creating section as said key information, the stored time representing a timing when the occurrence of the trigger event is detected.

3. The image information management system according to claim 2, wherein said image information management system further comprises a relay section which receives the standard time information and transmits secondary standard time information synchronized with the received standard time information to said imaging device.

4. The image information management system according to claim 2, wherein said image memory section stores the standard time counted by said clock section in association with each frame of an image photographed by said photographing section.

5. The image information management system according to claim 1, wherein said imaging device further comprises:
an image file obtaining section which receives a search condition and obtains the image file, which is stored in association with the key information satisfying the received search condition, from said image information memory section.

6. A method of operating an imaging device and an image information storage device connected to said imaging device through a network, the method comprising:
in said imaging device;
a detecting step of detecting an occurrence of a trigger event;
a photographing step of photographing images continually;
an image storing step of storing images photographed within a first predetermined time period before current time, and when the occurrence of a trigger event is detected in said detecting step, maintaining the images photographed within the first predetermined time period before the trigger event occurs and storing images photographed in said photographing step within a second predetermined time period after the trigger event occurs;
a first time stamping step of, when the occurrence of a trigger event is detected in said detecting step, asking a time stamp processing device connected through the network for time stamp processing of a compressed frame at trigger created by space compression of a latest frame of the images stored in said image storing step at the occurrence of the trigger event so as to obtain a time stamp of a time stamp result;
an image file creating step of, when the occurrence of a trigger event is detected in said detecting step, awaiting until the second predetermined time period lapses, and then creating an image file having a series of compressed frames created by space compression of the respective frames of the images stored in said image storing step; and a second time stamping step of asking said time stamp processing device connected through the network for time stamp processing of the image file created in said image file creating step so as to obtain a time stamp of a time stamp result; and in said image information storage device;

an image information storing step of obtaining the image file created in said image file creating step from said imaging device and storing the image file, key information associated with the image and the time stamps obtained in said first time stamping step and said second time stamping step, the key information including information relating to timing of the occurrence of the trigger event.

7. A non-transitory computer-readable recording medium in which a program is recorded, the program controlling a computer comprising a photographing section which photographs images to execute:

a detecting step of detecting an occurrence of a trigger event;

a photographing step of photographing images continually;

an image storing step of storing images photographed within a first predetermined time period before current time, and when the occurrence of a trigger event is detected in said detecting step, maintaining the images photographed within the first predetermined time period before the trigger event occurs and storing images photographed in said photographing step within a second predetermined time period after the trigger event occurs;

a first time stamping step of, when the occurrence of a trigger event is detected in said detecting step, asking a time stamp processing device connected through the network for time stamp processing of a compressed frame at trigger created by space compression of a latest frame of the images stored in said image storing step at the occurrence of the trigger event so as to obtain a time stamp of a time stamp result;

an image file creating step of, when the occurrence of a trigger event is detected in said detecting step, awaiting until the second predetermined time period lapses, and then creating an image file having a series of compressed frames created by space compression of the respective frames of the images stored in said image storing step;

a second time stamping step of asking said time stamp processing device connected through the network for time stamp processing of the image file created in said image file creating step so as to obtain a time stamp of a time stamp result; and an image information storing step of obtaining the image file created in said image file creating step from said imaging device and storing the image file, key information associated with the image and the time stamps obtained in said first time stamping step and said second time stamping step, the key information including information relating to timing of the occurrence of the trigger event.

* * * * *